(12) United States Patent
Ushiyama et al.

(10) Patent No.: US 8,679,212 B2
(45) Date of Patent: Mar. 25, 2014

(54) AIR CLEANER DEVICE

(75) Inventors: Hideyuki Ushiyama, Wako (JP);
Atsumu Naoi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 13/355,649

(22) Filed: Jan. 23, 2012

(65) Prior Publication Data

US 2012/0186207 A1 Jul. 26, 2012

(30) Foreign Application Priority Data

Jan. 24, 2011 (JP) ................. 2011-012207

(51) Int. Cl.
| | | |
|---|---|---|
| *B01D 50/00* | (2006.01) | |
| *B01D 59/50* | (2006.01) | |
| *B01D 45/00* | (2006.01) | |
| *B01D 46/00* | (2006.01) | |
| *B01D 49/00* | (2006.01) | |
| *B01D 51/00* | (2006.01) | |
| *B01D 53/00* | (2006.01) | |
| *B01D 57/00* | (2006.01) | |
| *B01D 59/00* | (2006.01) | |
| *B01D 39/00* | (2006.01) | |

(52) U.S. Cl.
USPC .............. 55/385.3; 55/502; 55/385.1; 55/423

(58) Field of Classification Search
USPC ............................ 55/502, 385.3, 385.1, 423
See application file for complete search history.

(56) References Cited

U.S. PATENT DOCUMENTS

| | | | | |
|---|---|---|---|---|
| 5,213,596 | A * | 5/1993 | Kume et al. ................ | 55/481 |
| 5,545,241 | A * | 8/1996 | Vanderauwera et al. ....... | 55/490 |
| 5,725,624 | A * | 3/1998 | Ernst et al. .................. | 55/502 |
| 5,759,217 | A * | 6/1998 | Joy ............................. | 55/320 |
| 6,231,630 | B1 * | 5/2001 | Ernst et al. .................. | 55/385.3 |
| 6,355,077 | B1 * | 3/2002 | Chittenden et al. .......... | 55/385.3 |
| 6,610,116 | B1 * | 8/2003 | Avery ......................... | 55/385.1 |
| 6,758,873 | B2 * | 7/2004 | Gieseke et al. .............. | 55/330 |
| 8,083,825 | B2 * | 12/2011 | Mosset et al. ............... | 55/502 |
| 8,177,875 | B2 * | 5/2012 | Rogers et al. ............... | 55/486 |
| 8,277,532 | B2 * | 10/2012 | Reichter et al. ............. | 55/502 |
| 8,404,014 | B2 * | 3/2013 | Israel et al. ................. | 55/385.3 |
| 2008/0035103 | A1 * | 2/2008 | Barris et al. ............... | 123/198 E |

FOREIGN PATENT DOCUMENTS

| | | |
|---|---|---|
| DE | 4125341 | 2/1993 |
| EP | 1647701 | 4/2006 |
| JP | 2003-184669 | 7/2003 |

* cited by examiner

*Primary Examiner* — Amber Orlando
(74) *Attorney, Agent, or Firm* — Rankin, Hill & Clark LLP

(57) ABSTRACT

An air cleaner device whereby the number of component parts is reduced and the filter element can be maintained and inspected without a time-consuming procedure. The air cleaner device includes: a support part provided to a cleaner case and having a fitting ingress at a region on the opposite side thereof from the cover; and a pivot provided to the cover and having a convex part capable of fitting in the fitting ingress of the support part. A hinge part for connecting the cover to the cleaner case so that the cover can open and close is formed by the support part and the pivot by fitting of the convex part in the fitting ingress.

4 Claims, 17 Drawing Sheets

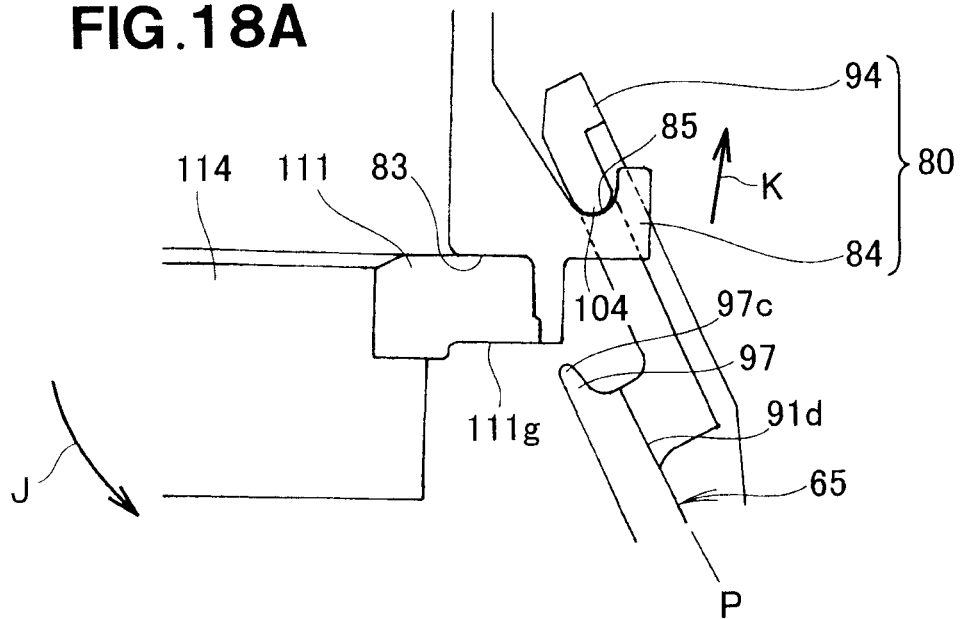
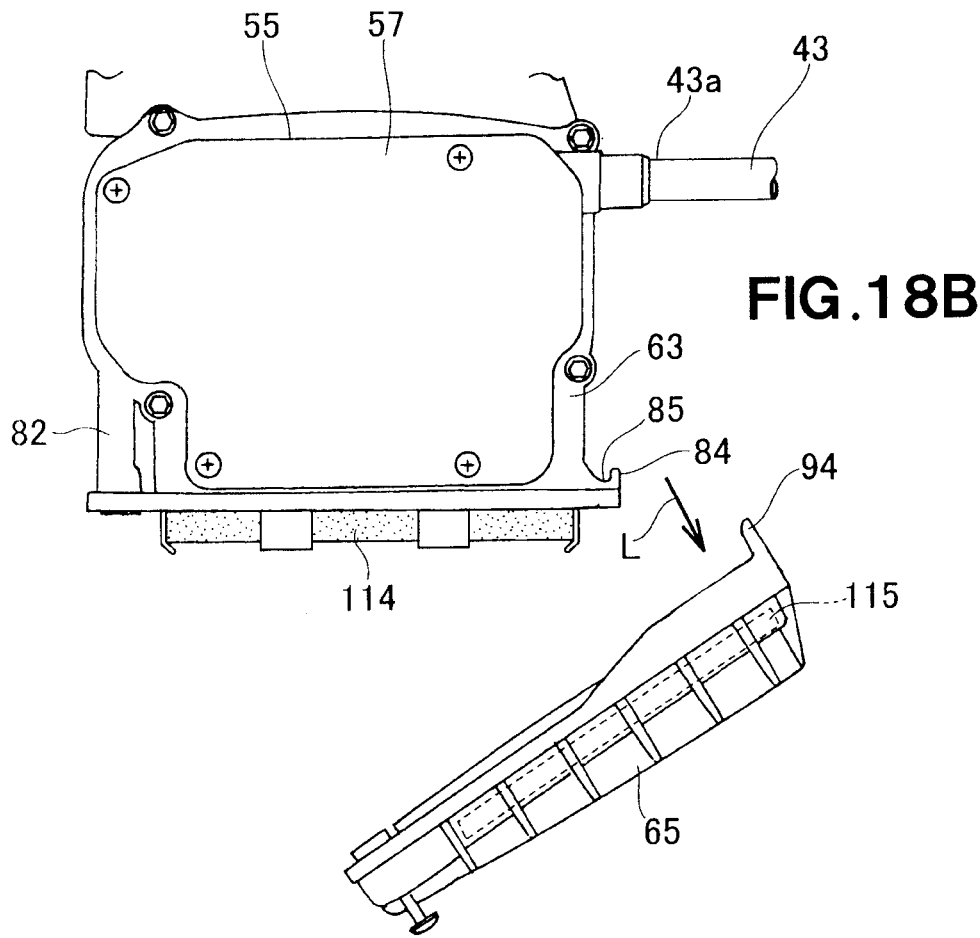

AIR CLEANER DEVICE

FIELD OF THE INVENTION

The present invention relates to an air cleaner device wherein a filter element is provided partway in an air intake passage communicating with a motor and air drawn into the air intake passage is cleaned by the filter element and introduced into the motor.

BACKGROUND OF THE INVENTION

Known air cleaner devices include the air cleaner device disclosed in Japanese Patent Application Laid-Open Publication No. 2003-184669 (JP 2003-184669 A), for example, in which a filter element is housed in a case, a plurality of engaging parts is provided to the case in which the filter element is housed, and a plurality of clamps capable of engaging with the plurality of engaging parts is provided to a case cover.

In this air cleaner device, the case cover is attached to the case by engaging the plurality of clamps with the respective plurality of engaging parts. The case cover is removed from the case by disengaging the plurality of clamps from the plurality of engaging parts.

In order for the case cover to be attached merely by engaging the clamps with the engaging parts, the plurality of engaging parts must be provided throughout the entire perimeter of the case, and the plurality of clamps must be provided throughout the entire perimeter of the case cover, as in the air cleaner device disclosed in JP 2003-184669 A. The need for a large number of engaging parts and clamps interferes with efforts to reduce the number of component parts.

In order to remove the case cover from the cover for maintenance and inspection (maintenance) of the filter element, a large number of clamps must be disengaged from the engaging parts. Maintenance and inspection of the filter element is therefore time consuming, and improvement can be made in this regard.

SUMMARY OF THE INVENTION

It is an object of the present invention to provide an air cleaner device whereby the number of component parts is reduced and the filter element can be maintained and inspected without a time-consuming procedure.

According to an aspect of the present invention, there is provided an air cleaner device which comprises: a cleaner case provided to an intake passage communicating with an intake port of a motor; a cover detachably attached the cleaner case; and a filter element provided between the cover and the cleaner case, so that air drawn into the intake passage from an outside is cleaned by the air filter and introduced into the intake port, wherein the air cleaner device further comprises: a support part provided to the cleaner case and having a fitting ingress at a region on an opposite side thereof from the cover; and a pivot provided to the cover and having a convex part capable of fitting in the fitting ingress of the support part; and a hinge part formed by engagement of the convex pat in the fitting ingress so as to openably and closably connecting, with the support part and the pivot, the cover to the cleaner case.

In this manner, the support part is thus provided to the cleaner case, while the fitting ingress is formed in the support part. The pivot is also provided to the cover, and the convex part capable of fitting in the fitting ingress is formed on the pivot. The hinge part (hinge) is also formed by the support part and the pivot by fitting of the convex part in the fitting ingress. The cleaner case and the cover are connected by the hinge part so that the cover can open and close. Consequently, the cleaner case and the cover are connected by the hinge part so as to be able to open and close, and the number of engaging members (e.g., bolts) for attaching the cover to the cleaner case can thereby be reduced. Furthermore, the support part of the hinge part is formed integrally with the cleaner case, and the pivot of the hinge part is formed integrally with the cover. The number of component parts can thereby be reduced, and a filter element can be maintained and inspected without a time-consuming procedure. By reducing the number of engaging members for attaching the cover to the cleaner case, the cover 65 can easily be attached and detached in a confined space.

Preferably, the cleaner case comprises an elastically deformable seal member for supporting an entire perimeter of the filter element; the cover having a projection provided so as to be able to compress the entire perimeter of the seal member; and engaging parts provided on an opposite side of the cover from the hinge part, the engaging parts being capable of engaging with the cleaner case; and the projection being formed so as to have a large protrusion dimension in middle parts thereof between the hinge part and the engaging parts within a peripheral wall of the cover. In a state in which the engaging parts of the cover are attached to the cleaner case by the engaging members (e.g., bolts), the seal part can be reliably compressed at the middle parts (i.e., the middle parts of the cover) of the projection. The state of compression of the seal part by the projection (i.e., the cover) can thereby be suitably maintained throughout the entire perimeter of the seal part.

Desirably, the cover has an opening provided in the pivot of the cover; and in a state in which the cover is attached to the cleaner case, the seal member for supporting the filter element can be exposed to the outside through the opening. The seal part exposed in the opening is thus visible from the outside (i.e., the outside of the cover). The installation state of the seal part (i.e., the filter element) can thereby be easily confirmed when the cover is attached to the cleaner case, and installation of the seal part can be facilitated.

BRIEF DESCRIPTION OF THE DRAWINGS

A preferred embodiment of the present invention will be described in detail below, by way of example only, with reference to the accompanying drawings, in which:

FIGS. 18A and 18B illustrate an example of the removal of the cover.

DESCRIPTION OF THE PREFERRED EMBODIMENTS

An air cleaner device 45 according to the present embodiment is used in a cogeneration apparatus 10.

Figure 1:
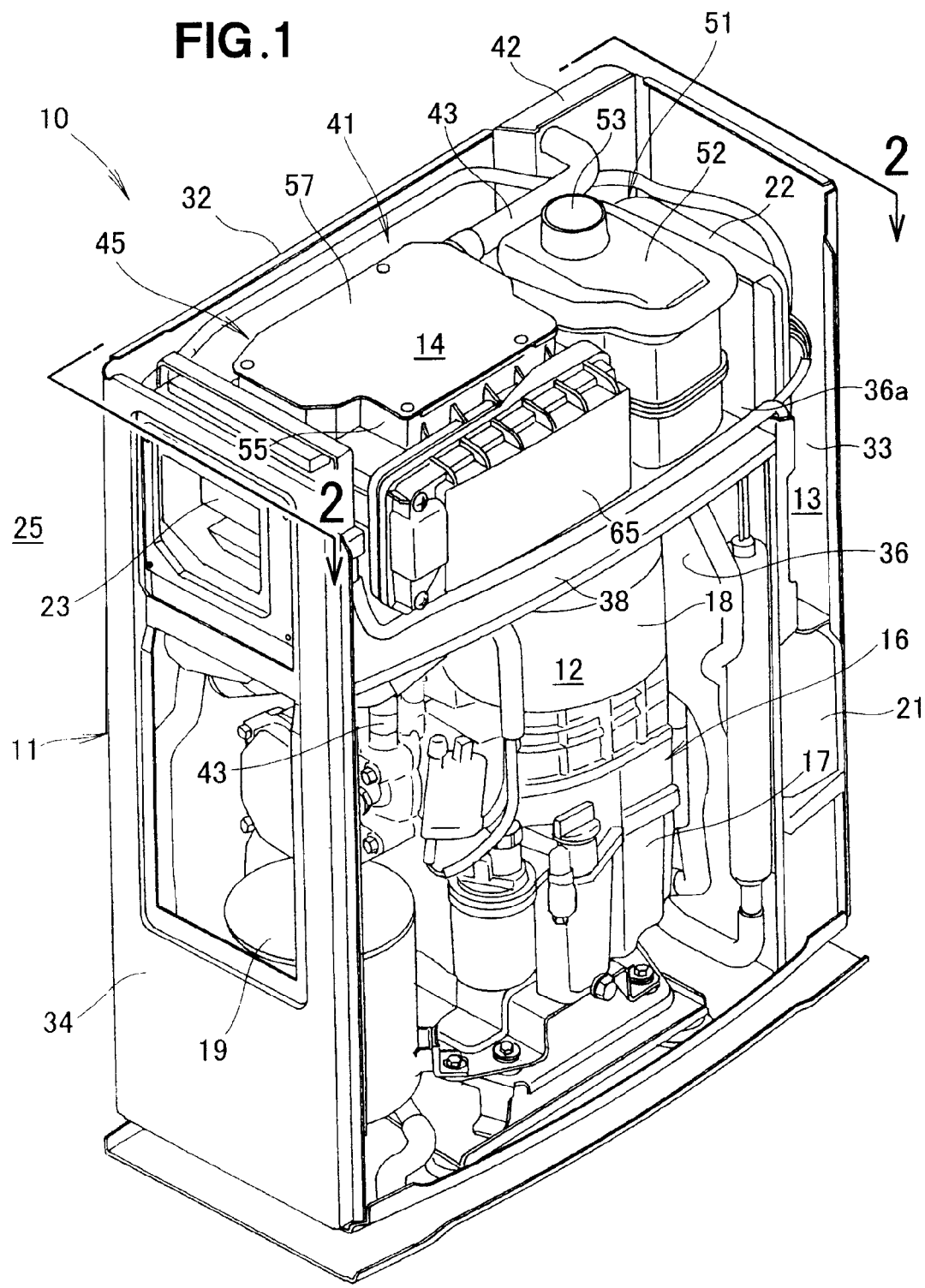
FIG. 1 is a perspective view showing a cogeneration apparatus provided with an air cleaner device according to an embodiment of the present invention.

As shown in FIG. 1, the cogeneration apparatus 10 is a combined heat and power apparatus provided with a cogeneration case (housing) 11 that is partitioned into a generator housing section 12 and an electrical component housing section 13; an engine (motor) 16 housed in a bottom part of the generator housing section 12; a generator 18 provided to a top part of an engine body 17; a heat exchanger 19 provided beside the engine body 17; a first control unit 21 housed in a bottom part of the electrical component housing section 13; and a power converter 22 housed in a top part of the electrical component housing section 13.

The cogeneration case 11 is formed having a substantially rectangular shape by a front panel, a rear panel 32, a left side panel 33, a right side panel 34, and a roof panel. The front panel and the roof panel are not shown in the drawings. A dividing wall 36 is provided near the left side panel 33 in the cogeneration case 11 so as to be aligned with the left side panel 33. A top divider 38 is further provided so as to extend to the right side panel 34 from a top end part 36a of the dividing wall 36.

The dividing wall 36 provided inside the cogeneration case 11 partitions the space inside the cogeneration case 11 into left and right spaces for the generator housing section 12 and the electrical component housing section 13. The generator housing section 12 on the right side houses the engine 16, the generator 18, the heat exchanger 19, and other components. The electrical component housing section 13 on the left side houses the first control unit 21 and the power converter (inverter unit) 22.

Figure 2:
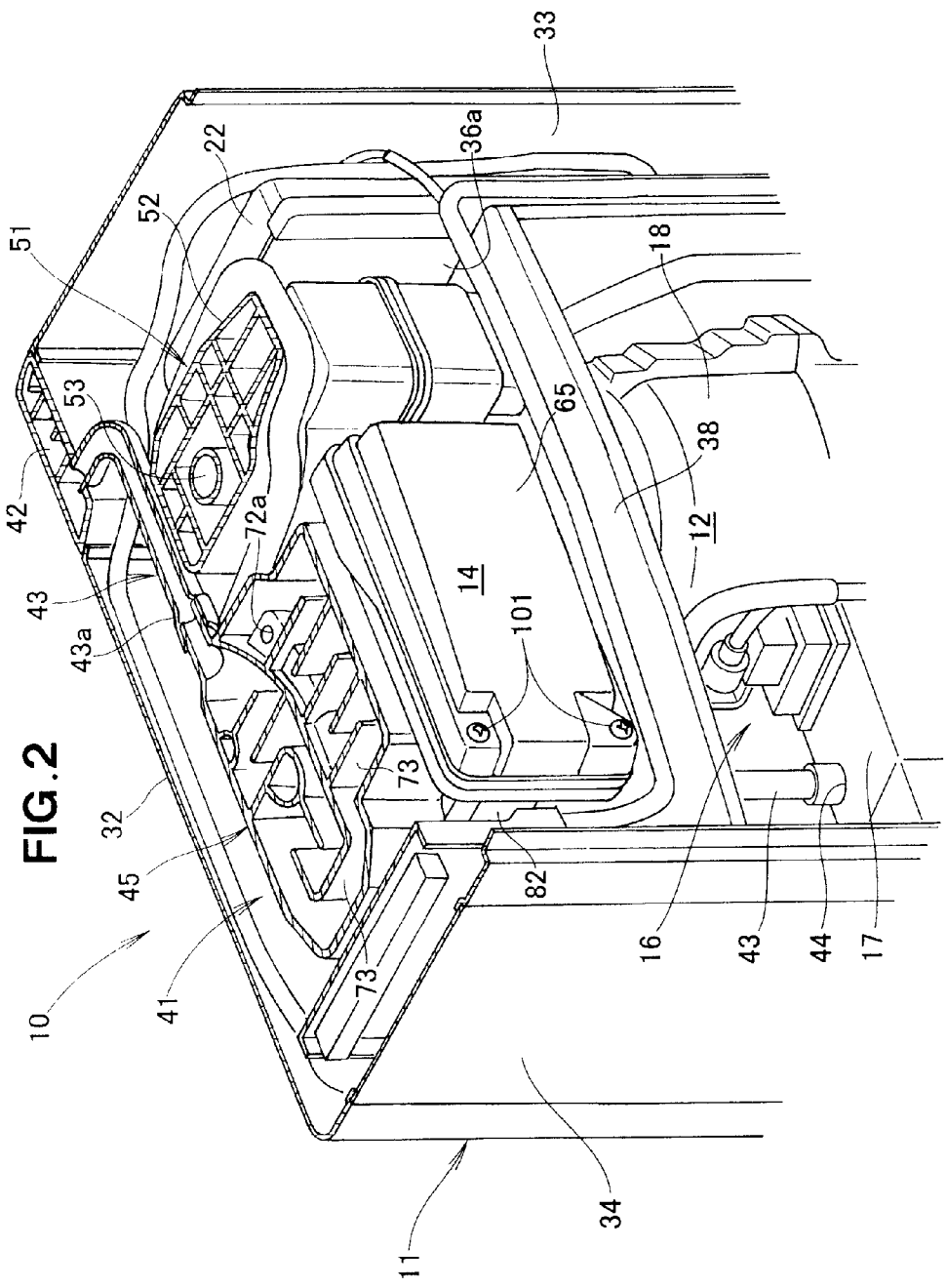
FIG. 2 is a sectional view taken along line 2-2 of FIG. 1.

As shown in FIG. 2, providing the top divider 38 inside the cogeneration case 11 partitions a space for an intake/exhaust part 14 above the generator housing section 12. The intake/exhaust part 14 houses a mixer (including a throttle valve), a gas flow rate adjustment device, and the air cleaner device 45 constituting a portion of an intake system 41 of the engine 16 (refer also to FIG. 1). The intake/exhaust part 14 houses a muffler 52 which constitutes a portion of an exhaust system 51 of the engine 16. The muffler 52 is communicated with an exhaust outlet 53 (refer also to FIG. 1).

The engine 16 is a gas engine provided with the intake system 41 and the exhaust system 51. The intake system 41 is provided with an air intake part 42 provided to the rear panel 32 of the cogeneration case 11; an intake passage 43 for communicating the air intake part 42 with an intake port 44 of the engine body 17; and the air cleaner device 45 which is provided partway in the intake passage 43. The gas flow rate adjustment device is provided on a downstream side of the air cleaner device 45 in the intake passage 43, and the mixer is provided to the gas flow rate adjustment device. The mixer includes a throttle valve.

By the intake system 41, outside air (air) drawn in from the air intake part 42 is conducted to the intake passage 43, and the air conducted to the intake passage 43 is conducted to the air cleaner device 45. As air is conducted to the air cleaner device 45, the conducted air is cleaned by the air cleaner device 45. The air cleaned by the air cleaner device 45 is mixed with gas fuel by the mixer, and the mixed gas fuel is conducted to the throttle valve. The gas fuel passing through the throttle valve passes through the intake port 44 of the engine body 17 and is introduced into a combustion chamber to drive the engine 16.

As shown in FIG. 1, the generator 18 is provided to a top part of the engine body 17, and a drive shaft of the generator 18 is coaxially connected to a crankshaft of the engine 16. Driving of the generator 18 by the engine 16 enables electrical power (alternating-current power) to be generated by the generator 18.

Exhaust gas of the engine 16 is conducted to the heat exchanger 19, water from the outside 25 is conducted to the heat exchanger 19, and the heat exchanger 19 heats the water by heat exchange between the exhaust gas and the water. Hot water is thus generated using waste heat of the engine 16 as a heat source, and the generated hot water can be led to the outside 25 of the cogeneration apparatus 10 to be used for a heater or the like.

The first control unit 21 is provided on substantially the lower half of the dividing wall 36, and is thereby disposed in the electrical component housing section 13. The first control unit 21 is described by way of example as being an earth leakage circuit breaker, but this configuration is not limiting, and the first control unit 21 may be provided with other engine control capabilities.

The cogeneration apparatus 10 is provided with a second control unit 23 on a right side (space of the intake/exhaust part 14) of the air cleaner device 45. The second control unit 23 is an ECU provided with such functions as controlling the engine 16 so that the generator 18 is switched to a starter function during startup of the engine 16, and the generator 18 is switched to a generator function after startup of the engine 16. The second control unit 23 may be installed in any space other than that of the generator housing section 12, and can therefore be disposed in the electrical component housing section 13.

The power converter 22 is provided on an upper half of the dividing wall 36, and is thereby disposed in the electrical component housing section 13. The power converter 22 is an inverter unit for converting the alternating-current power generated by the generator 18 into power of the required specification.

Figure 3:
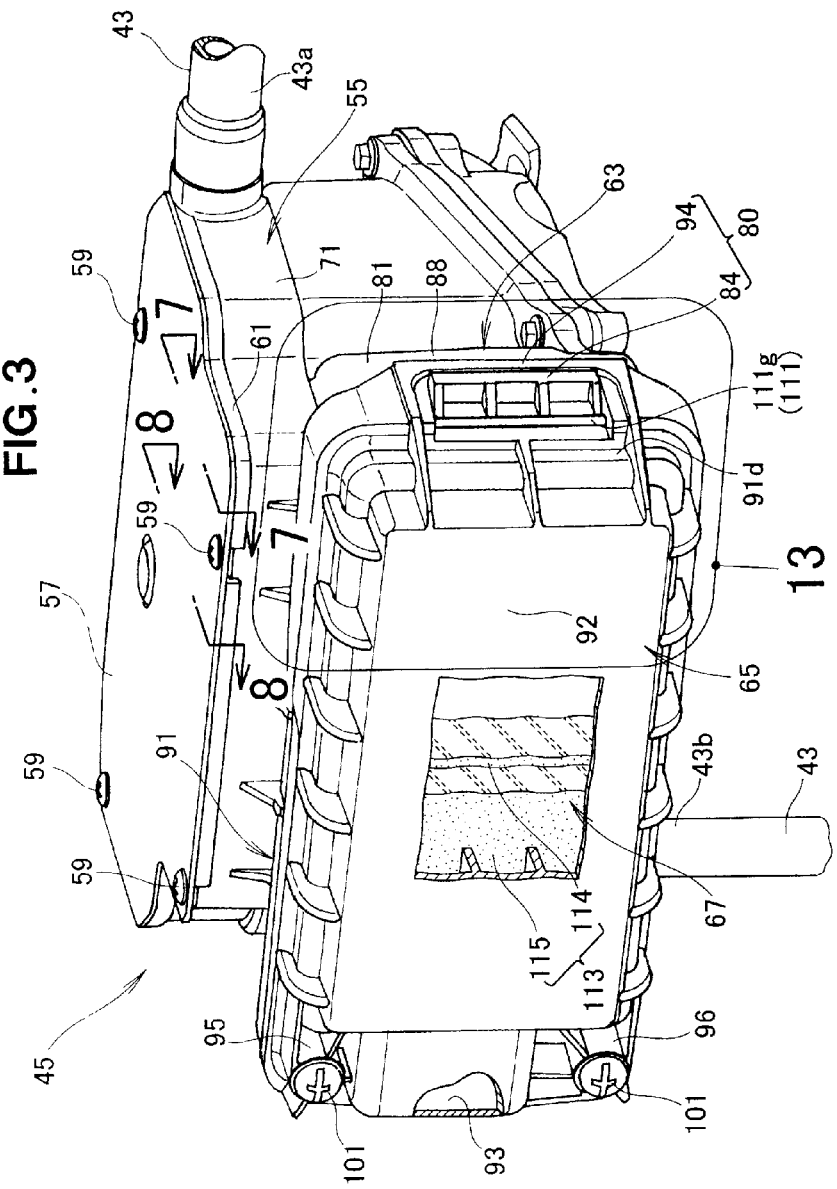
FIG. 3 is a perspective view showing the air cleaner device of FIG. 2.
Figure 4:
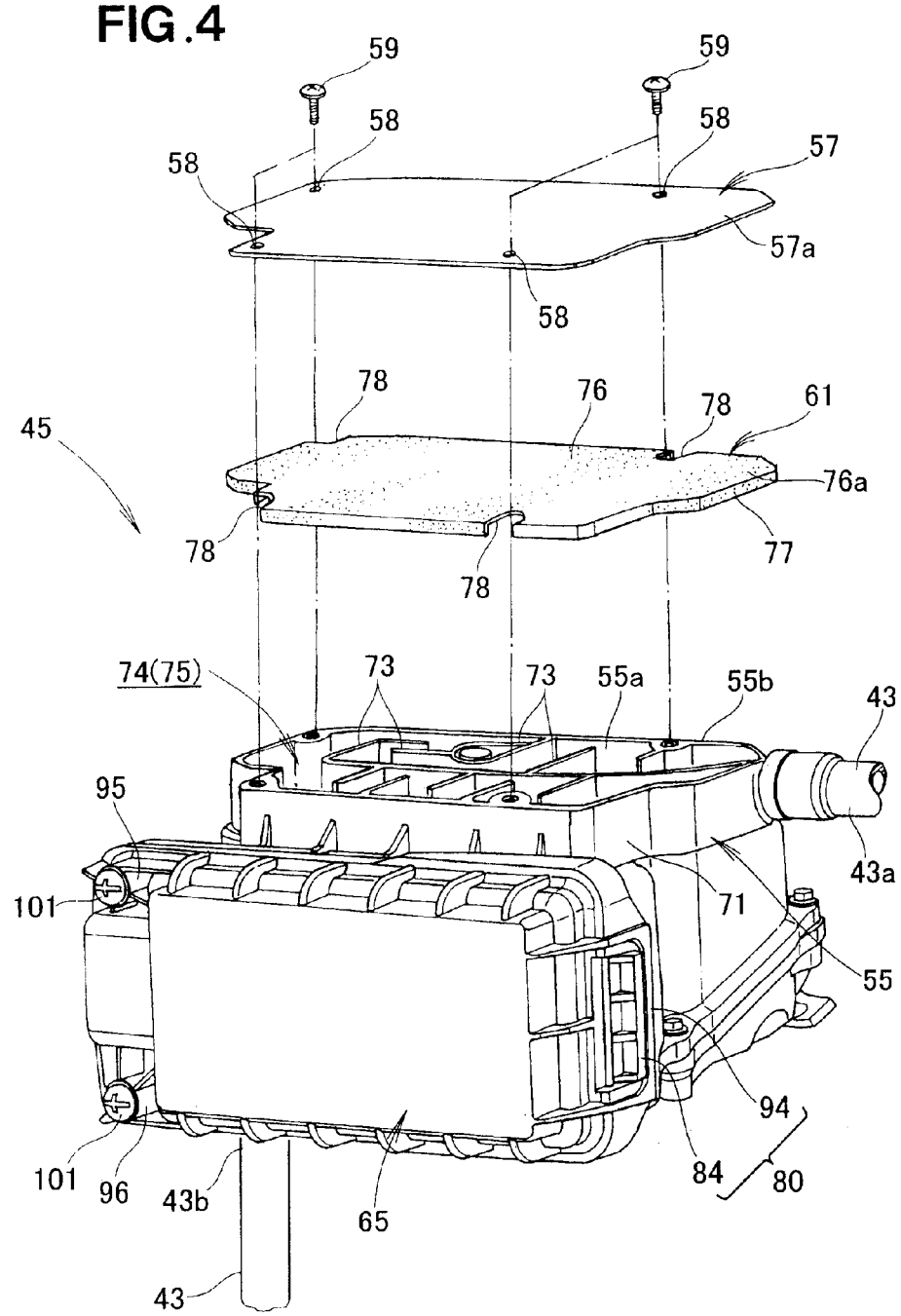
FIG. 4 is an exploded perspective view showing the air cleaner device of FIG. 3, with a lid removed.
Figure 5:
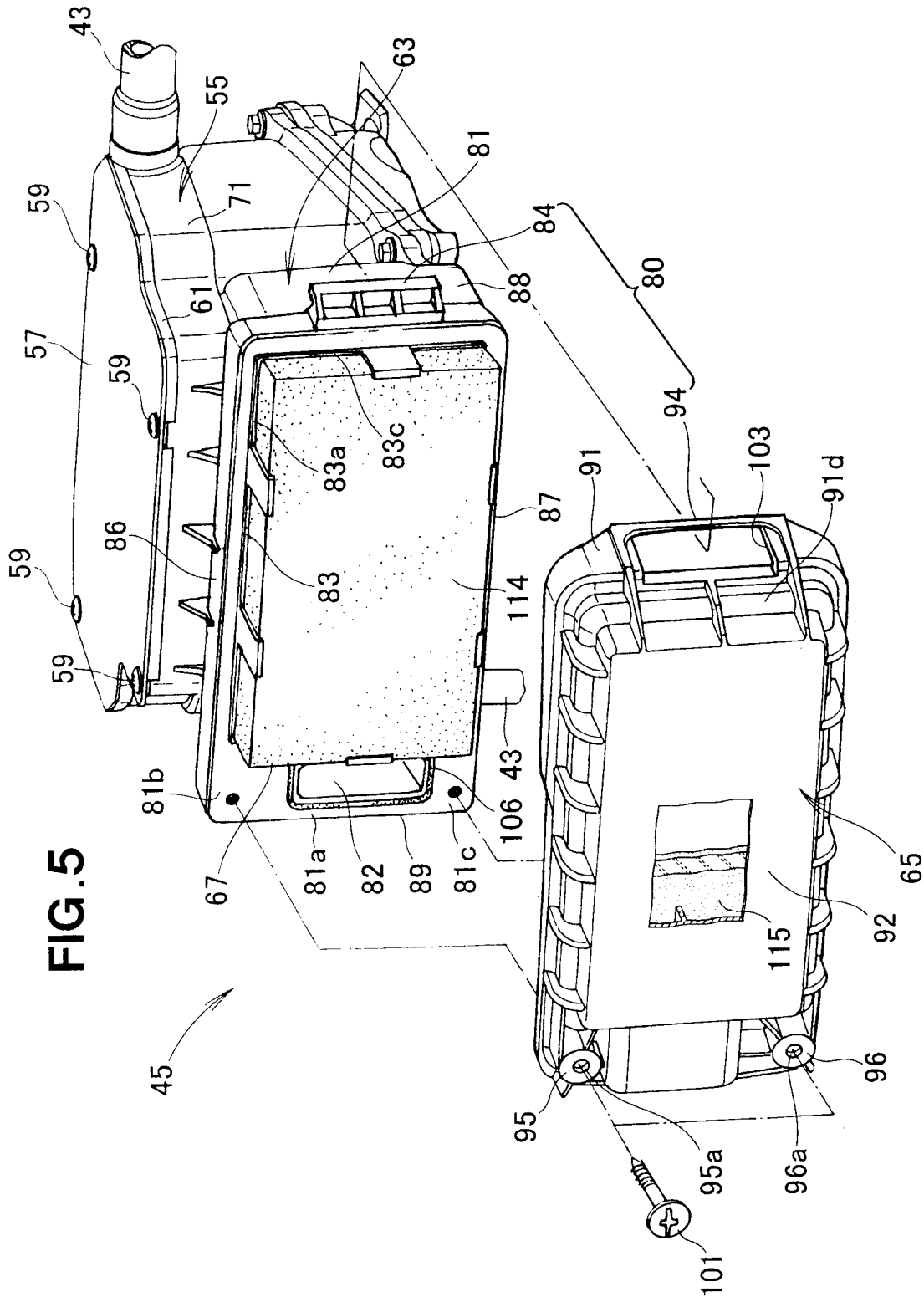
FIG. 5 is an exploded perspective view showing the air cleaner device of FIG. 3, with a cover removed.

As shown in FIGS. 3 and 4, the air cleaner device 45 is provided with an intake case 55 provided at an upstream point 43a of the intake passage 43; a lid 57 for covering a top end opening 55a of the intake case 55; and a sound absorbing member 61 interposed between the lid 57 and the intake case 55. As shown in FIG. 5, the air cleaner device 45 is provided with a cleaner case 63 provided to the intake case 55; a cover 65 detachably provided to the cleaner case 63; and an element unit 67 (refer also to FIG. 6) provided between the cover 65 and the cleaner case 63.

Figure 6:
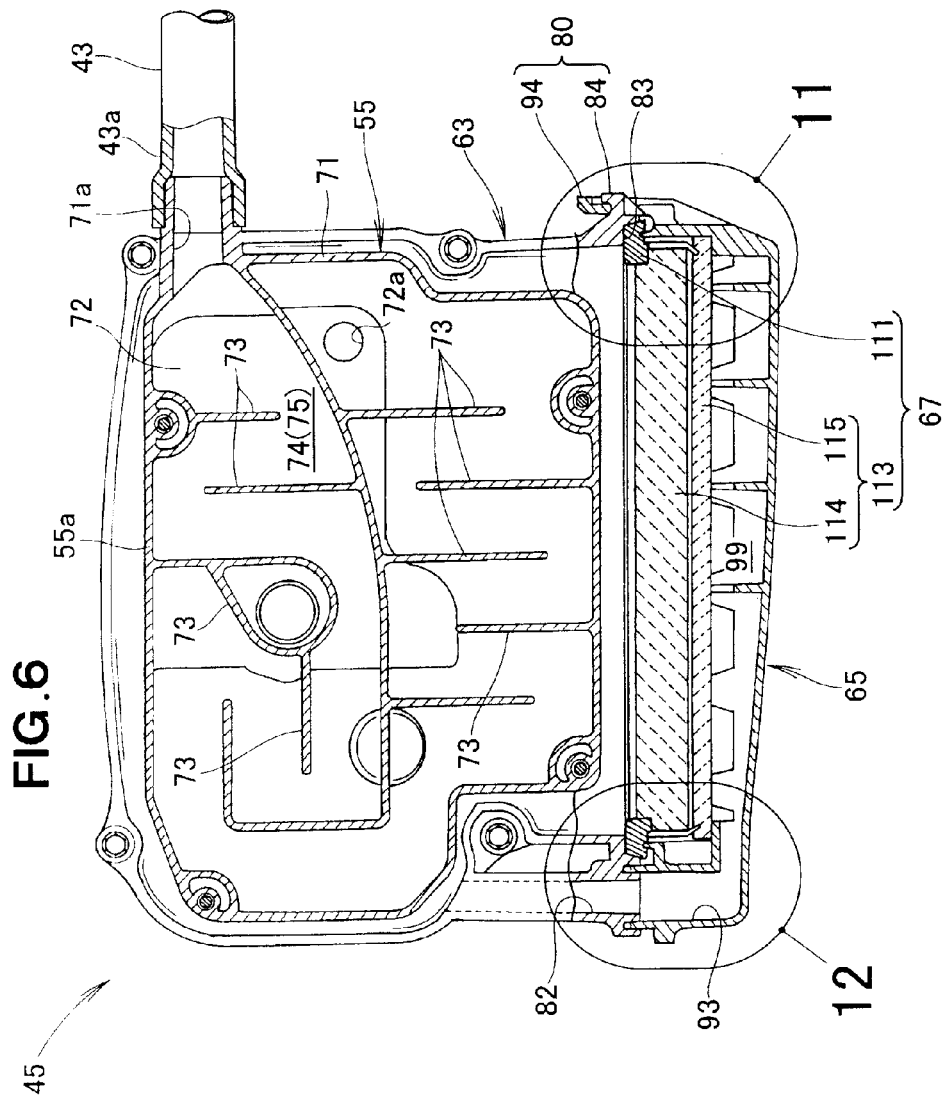
FIG. 6 is a cross-sectional view showing the air cleaner device of FIG. 3.

As shown in FIGS. 4 and 6, the intake case 55 is formed of a resin material in a box shape. The intake case 55 has an intake peripheral wall 71 formed having a substantially rectangular shape; a bottom part 72 for blocking a lower part of the intake peripheral wall 71; a plurality of barriers 73 provided to the intake peripheral wall 71 and the bottom part 72; an inflow port 71a formed in a left rear end part of the intake peripheral wall 71; and an outflow port 72a formed in a left end part of the bottom part 72.

A case space 74 open at a top end part 55b of the intake case 55 is formed by the intake peripheral wall 71 and the bottom part 72. A top end opening 55a is formed by the opening of the top end part 55b. The plurality of barriers 73 provided to the intake peripheral wall 71 and the bottom part 72 cause the case space 74 to be partitioned in a labyrinth shape by the plurality of barriers 73.

The inflow port 71a is communicated with the case space 74 partitioned in a labyrinth shape, and the inflow port 71a is communicated with the upstream point 43a of the intake passage 43. The air inside the intake passage 43 is thereby conducted through the inflow port 71a to the case space 74 partitioned in a labyrinth shape.

The outflow port 72a is communicated with the case space 74 partitioned in a labyrinth shape, and the outflow port 72a is communicated with a cleaner inflow passage 82 (described hereinafter) of the cleaner case 63. The air inside the case space 74 partitioned in a labyrinth shape is thereby conducted through the outflow port 72a to the cleaner inflow passage 82.

The lid 57 is a metal plate formed having a substantially rectangular shape of a metal material, and is formed so that the lid 57 can be mounted on the top end part 55b of the intake case 55 via the sound absorbing member 61. With the lid 57 mounted on the top end part 55b of the intake case 55, the top end opening 55a is blocked by the lid 57. A plurality of attachment holes 58 is formed near an outer peripheral edge 57a of the lid 57.

Bolts 59 are inserted in the plurality of attachment holes 58, and the bolts 59 protruding from the plurality of attachment holes 58 are screwed into the top end part 55b of the intake case 55. The lid 57 is thereby detachably attached to the top end part 55b of the intake case 55 by the bolts 59.

Figure 7:
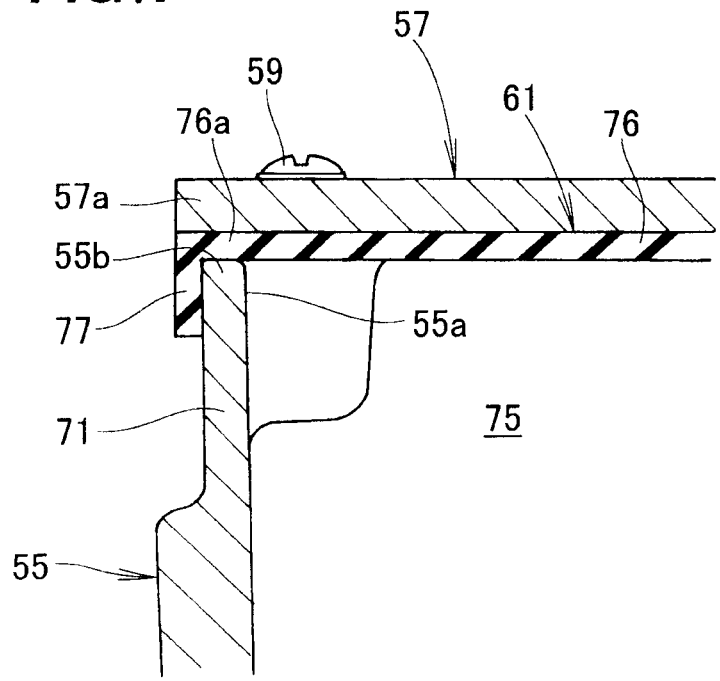
FIG. 7 is an enlarged cross-sectional view taken along line 7-7 of FIG. 3.

As shown in FIGS. 4 and 7, the sound absorbing member 61 is formed of urethane foam (urethane sponge), for example, or another sound absorbing material. The sound absorbing member 61 has a ceiling part 76 formed so as to be able to be mounted on the top end part 55b of the intake case 55, and a seal wall 77 that is provided along an outer peripheral edge 76a of the ceiling part 76, and a plurality of attachment ingresses 78 is formed near the outer peripheral edge 76a.

Figure 8:
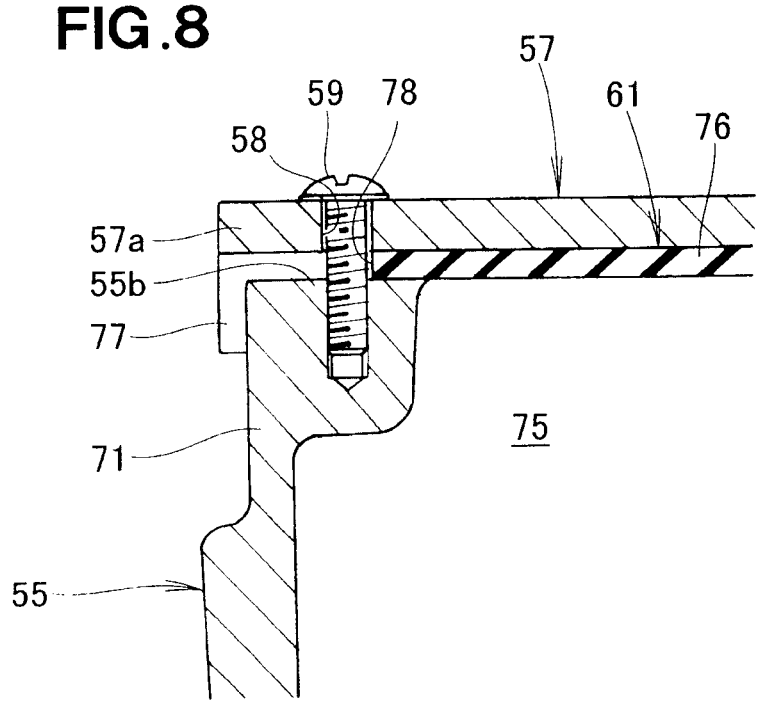
FIG. 8 is an enlarged sectional view taken along line 8-8 of FIG. 3.

As shown in FIGS. 4 and 8, the plurality of attachment ingresses 78 is formed so that the bolts 59 can pass through in positions opposite the attachment holes 58 of the lid 57. The bolts 59 are thus inserted into the attachment holes 58 and the attachment ingresses 78, and the bolts 59 protruding from the attachment ingresses 78 are screwed into the top end part 55b of the intake case 55. The lid 57 and the sound absorbing member 61 are thereby detachably attached to the top end part 55b of the intake case 55 by the plurality of bolts 59.

As shown in FIGS. 4 and 7, the ceiling part 76 has a flat shape formed substantially rectangular to enable mounting thereof on the top end part 55b of the intake case 55. The seal wall 77 is formed along the outer peripheral edge 76a of the ceiling part 76 a size larger than the top end part 55b of the intake case 55. The top end opening 55a of the intake case 55 is thereby covered by the seal wall 77 in a state in which the ceiling part 76 is mounted on the top end part 55b of the intake case 55. In this state, the lid 57 is attached to the top end part 55b of the intake case 55 by the plurality of bolts 59. Specifically, the seal wall 77 (i.e., the ceiling part 76) is interposed between the lid 57 and the top end part 55b of the intake case 55. The ceiling part 76 interposed between the lid 57 and the top end part 55b of the intake case 55 is thus compressed and sandwiched by the top end part 55b and the lid 57.

The sound absorbing member 61 is formed of a sound absorbing material, and the ceiling part 76 (sound absorbing member 61) is sandwiched in a compressed state by the lid 57 and the top end part 55b of the intake case 55. The sound absorbing member 61 thereby forms a seal between the top end part 55b and the lid 57.

The plurality of barriers 73 is formed so that top end parts of the barriers 73 have the same height as the top end part 55b of the intake case 55. The sound absorbing member 61 thereby forms a seal between the top end part 55b and the lid 57, and the case space 74 partitioned in a labyrinth shape is sealed by the sound absorbing member 61. The case space 74 partitioned in a labyrinth shape is sealed by the sound absorbing member 61, and is thereby formed into a labyrinth passage 75.

Formation of the labyrinth passage 75 (refer also to FIG. 6) by the intake case 55 and the sound absorbing member 61 enables a maze-shaped (curved) air passage to be formed, and ensures that the air passage is adequately long. Intake noise of the engine 16 that accompanies intake pulsation can thereby be reduced.

Formation of the labyrinth passage 75 by the intake case 55 and the sound absorbing member 61 also enables the sound absorbing member 61 to be provided in a portion of the labyrinth passage 75. Intake noise of the engine 16 that accompanies intake pulsation can thereby be more satisfactorily reduced by the sound absorbing member 61.

Furthermore, using a metal plate as the lid 57 makes it possible to ensure that the lid 57 has adequate mass. Vibration of the labyrinth passage 75 can be suppressed by ensuring that the lid 57 has adequate mass. Intake noise of the engine 16 that accompanies intake pulsation can thereby be more satisfactorily reduced by the lid 57 (metal plate).

A seal can also be formed between the lid 57 and the intake case 55 by the sound absorbing member 61. Since a seal is thus formed between the lid 57 and the intake case 55 by the sound absorbing member 61, intake noise of the engine 16 that accompanies intake pulsation can be more satisfactorily reduced.

Formation of the labyrinth passage 75 by the intake case 55 and the sound absorbing member 61 also enables the intake case 55 to additionally function as a silencing chamber (resonator). Since the intake case 55 thus additionally functions as a silencing chamber, there is no need to provide a separate silencing chamber to the intake passage 43. Intake noise can thereby be reduced without increasing the number of component parts.

Since there is no need to provide a separate silencing chamber to the intake passage 43, there is no longer a need for a space (accommodating space) to accommodate a separate silencing chamber.

Figure 9:
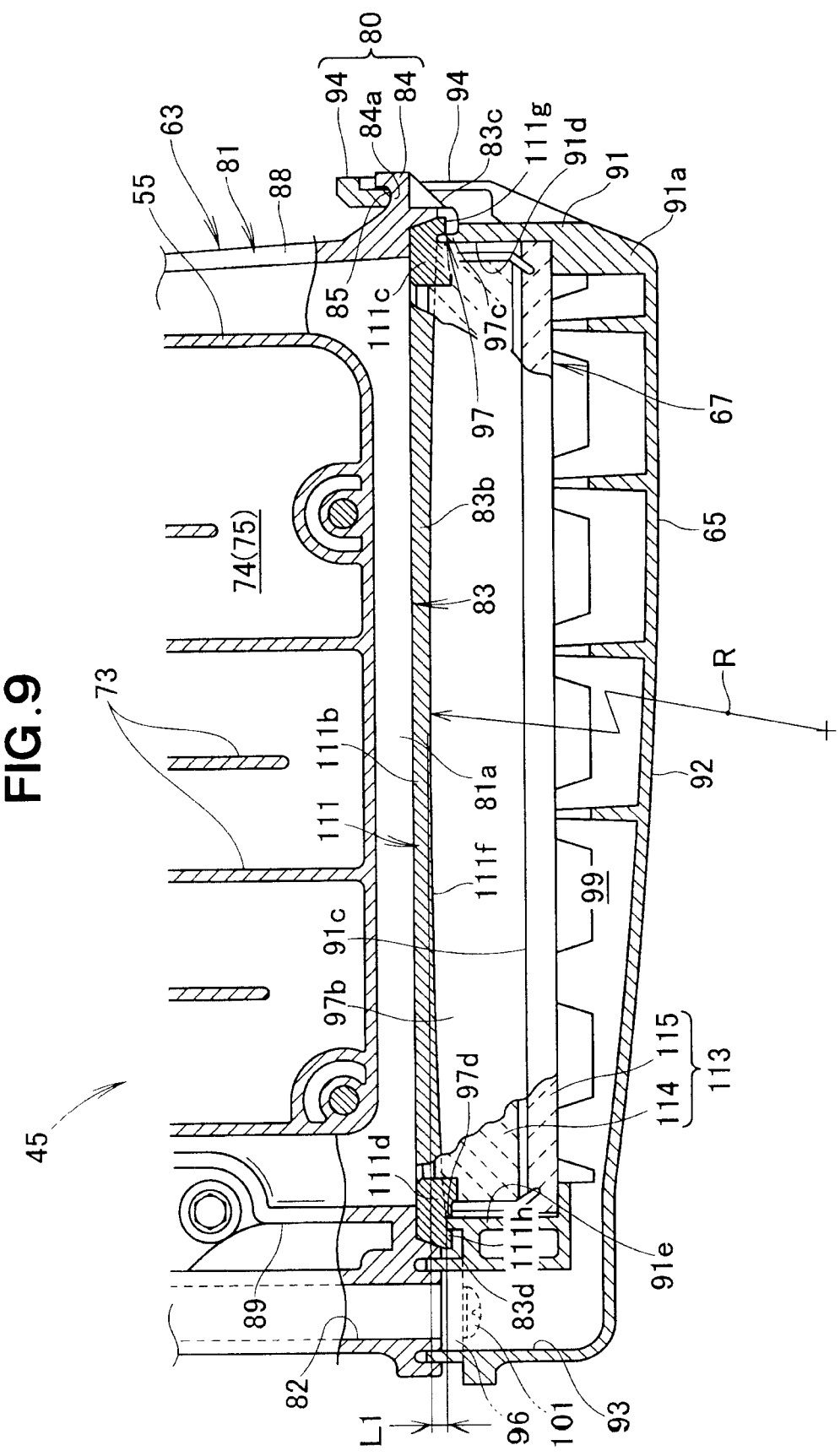
FIG. 9 is a cross-sectional view showing a cleaner case and a cover of the air cleaner device of FIG. 3.

As shown in FIGS. 5 and 9, the cleaner case 63 is a case made of resin that is provided integrally with a front lower part of the intake case 55 so as to face forward. The cleaner case 63 has a cleaner peripheral wall 81 provided integrally with the front lower part of the intake case 55 so as to face forward; a cleaner inflow passage 82 provided to a right-side wall 89 of the cleaner peripheral wall 81; a receiving ingress 83 provided to a front end part 81a of the cleaner peripheral wall 81; and a support part 84 provided to a left-side wall 88 of the cleaner peripheral wall 81.

The cleaner peripheral wall 81 is provided facing forward at the front lower part of the intake case 55, and is formed having a substantially rectangular shape by upper and lower walls 86, 87 and left and right side walls 88, 89. The front end part 81*a* of the cleaner peripheral wall 81 is open, and the rear end part thereof is communicated with a downstream point 43*b* (refer to FIG. 3) of the intake passage 43.

The cleaner inflow passage 82 is a passage whereby the outflow port 72*a* (FIG. 6) of the intake case 55 (labyrinth passage 75) can be communicated with a cover inflow passage 93 (described hereinafter). The outflow port 72*a* of the labyrinth passage 75 is provided to an upstream side of the cleaner inflow passage 82. The cover inflow passage 93 is provided to a downstream side of the cleaner inflow passage 82. The cleaner inflow passage 82 and the cover inflow passage 93 are communicated in a sealed state via a seal 106 (refer to FIGS. 5 and 12).

The receiving ingress 83 is provided to the front end part 81*a* of the cleaner peripheral wall 81, and is formed having a substantially rectangular shape by upper and lower receiving ingresses 83*a*, 83*b* and left and right receiving ingresses 83*c*, 83*d*. The upper receiving ingress 83*a* is formed so as to be able to accept an upper seal part 111*a* (refer to FIG. 10) of a seal part member 111 of the element unit 67. The lower receiving ingress 83*b* is formed so as to be able to accept a lower seal part 111*b* of the seal member 111 of the element unit 67.

The left receiving ingress 83*c* is formed so as to be able to accept a left seal part 111*c* of the seal member 111 of the element unit 67. The right receiving ingress 83*d* is formed so as to be able to accept a right seal part 111*d* of the seal member 111 of the element unit 67. Specifically, the receiving ingress 83 is formed so as to be able to accept the seal member 111 of the element unit 67.

The support part 84 is formed so as to protrude outward to the left from the left-side wall 88 of the cleaner peripheral wall 81. The support part 84 has a fitting ingress 85 (refer also to FIG. 11) at a rearward region (region on the opposite side from the cover 65) 84*a* thereof. The fitting ingress 85 is formed having a substantially semi-circular (curved) concave shape.

Figure 10:
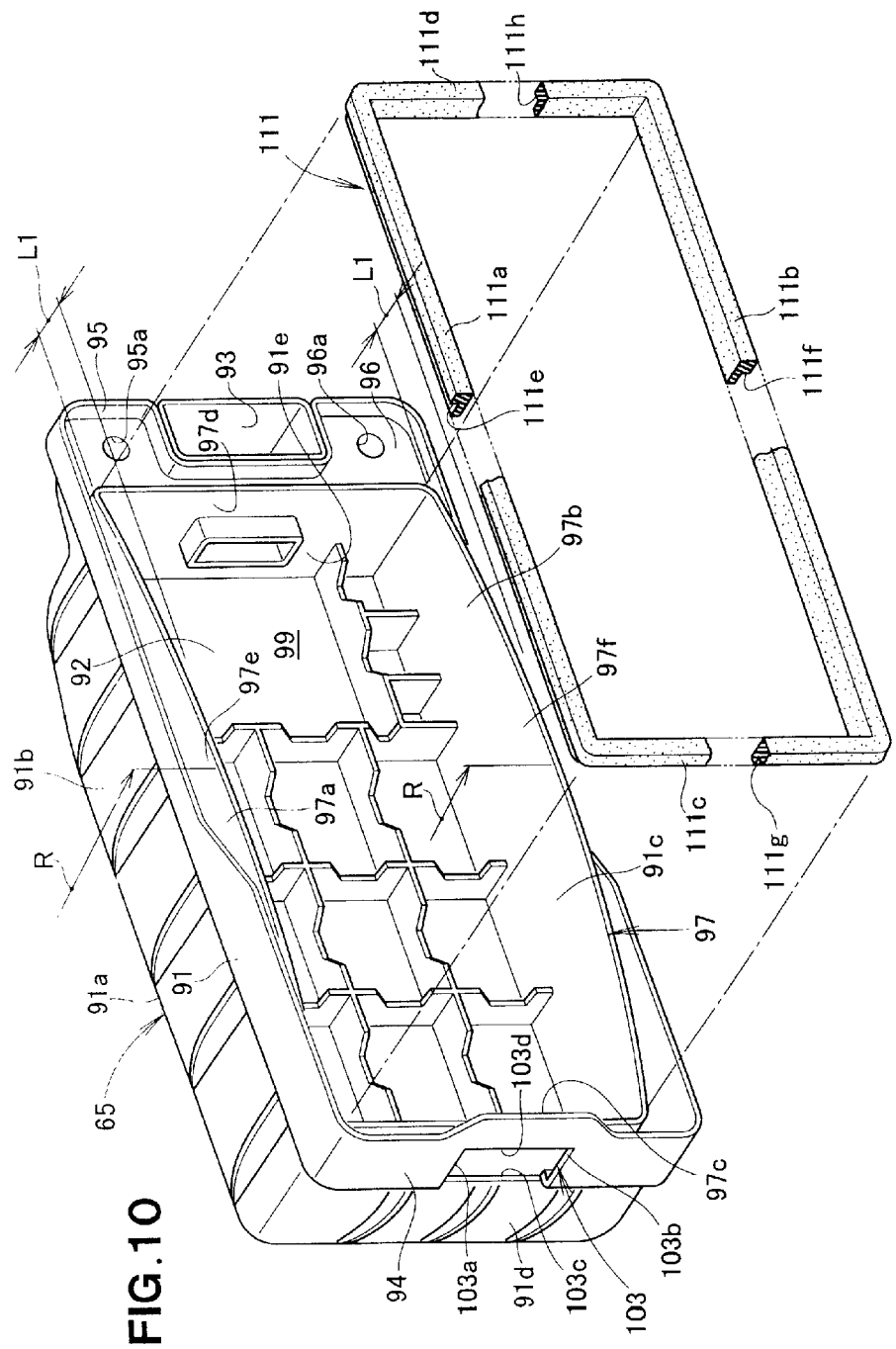
FIG. 10 is a perspective view showing the cover of the air cleaner device.

As shown in FIGS. 9 and 10, the cover 65 is a member made of resin that is provided so as to be capable of attaching to and detaching from the cleaner case 63. The cover 65 has a cover peripheral wall 91 formed so as to fit against the receiving ingress 83 of the cleaner peripheral wall 81; a cover flat part 92 for blocking a front end part 91*a* of the cover peripheral wall 91; and a cover inflow passage 93 provided to a right end part of the cover peripheral wall 91. The front end part 91*a* of the cover peripheral wall 91 is blocked by the cover flat part 92, and a cover space 99 is thereby formed inside the cover 65.

The cover 65 also has a pivot 94 provided to the right end part of the cover peripheral wall 91; upper and lower engaging parts (engaging parts) 95, 96 provided above and below the cover inflow passage 93; and a projection 97 that protrudes forward from the cover peripheral wall 91 and is formed so as to fit against the receiving ingress 83.

As shown in FIGS. 9 and 10, the cover peripheral wall 91 is formed as a substantially rectangular frame by upper and lower walls 91*b*, 91*c* and left and right side walls 91*d*, 91*e*. An upper projection 97*a* protrudes toward the upper receiving ingress 83*a* (FIG. 5) from a front end part of the upper wall 91*b*. A lower projection 97*b* protrudes toward the lower receiving ingress 83*b* from a front end part of the lower wall 91*c*.

A left projection 97*c* protrudes toward the left receiving ingress 83*c* from a front end part of the left side wall 91*d*. A right projection 97*d* protrudes toward the right receiving ingress 83*d* from a front end part of the right side wall 91*e*. The upper and lower projections 97*a*, 97*b* and the left and right projections 97*c*, 97*d* are integrally formed. The projection 97 as a substantially rectangular frame is thus formed by the upper and lower projections 97*a*, 97*b* and the left and right projections 97*c*, 97*d*. The projection 97 is capable of compressing the entire length of the seal member 111.

The upper projection 97*a* is formed having an arcuate shape with radius R as viewed from above, and thereby protrudes in a curve toward the upper receiving ingress 83*a* (FIG. 5). In the same manner, the lower projection 97*b* is formed having an arcuate shape with radius R as viewed from above, and thereby protrudes in a curve toward the lower receiving ingress 83*b*. The left and right projections 97*c*, 97*d* are linearly formed.

Since the upper projection 97*a* is formed so as to be curved, an upper middle part (middle part) 97*e* of the upper projection 97*a* is formed a protrusion dimension L1 larger than the left and right projections 97*c*, 97*d*. In the same manner, since the lower projection 97*b* is formed so as to be curved, a lower middle part (middle part) 97*f* of the lower projection 97*b* is formed a protrusion dimension L1 larger than the left and right projections 97*c*, 97*d*.

The upper and lower middle parts 97*e*, 97*f* are positioned at the middle in the width direction between the pivot 94 (hinge part 80) and the upper and lower engaging parts 95, 96. As described hereinafter, the upper and lower engaging parts 95, 96 are points of attachment to the cleaner case 63 by upper and lower bolts (engaging members) 101. The reason for designing the upper and lower middle parts 97*e*, 97*f* so as to protrude further than the left and right projections 97*c*, 97*d* will be described in detail hereinafter.

Figure 11:
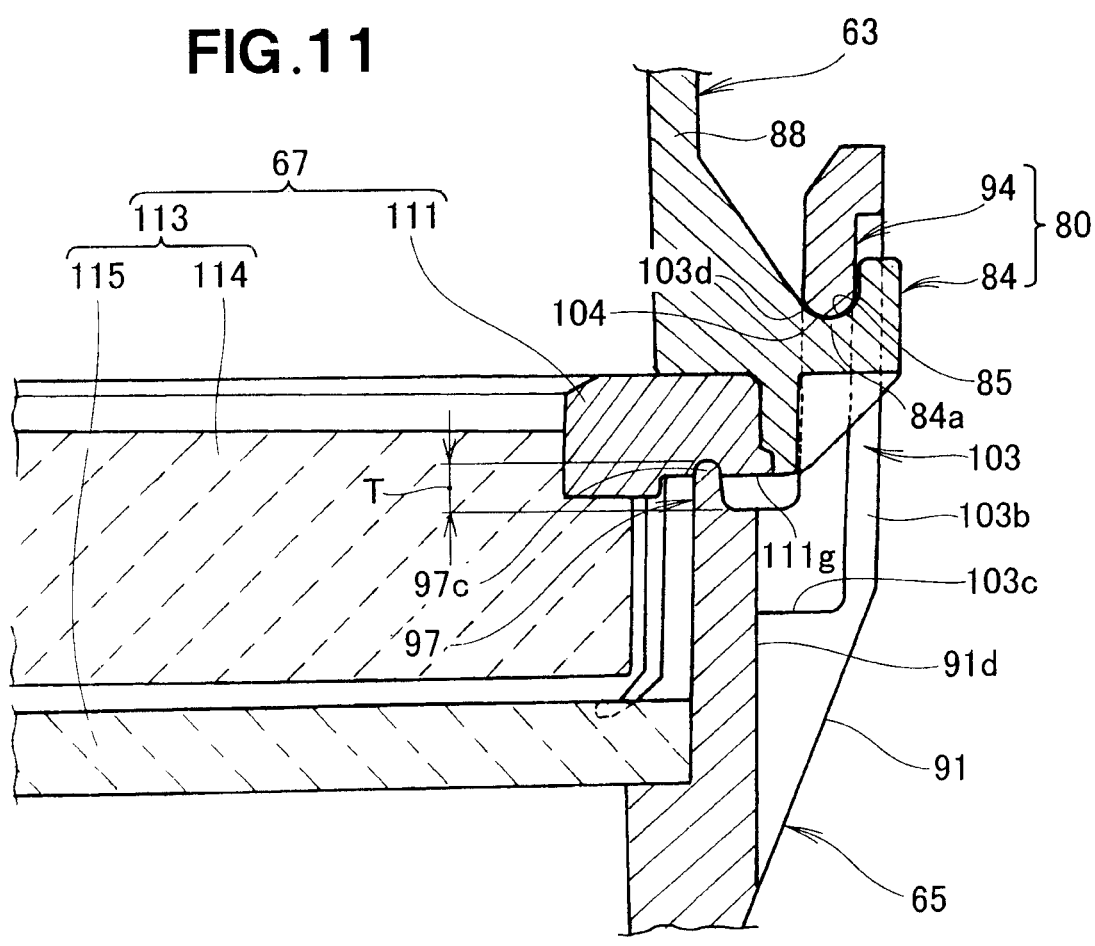
FIG. 11 is an enlarged cross-sectional view showing an area 11 of FIG. 6.

As shown in FIG. 11, in the state in which the cover 65 is attached to the cleaner case 63, a state is maintained in which a left compression surface 111*g* of the seal member 111 is compressed by the left projection 97*c* of the left side wall 91*d*.

Figure 12:
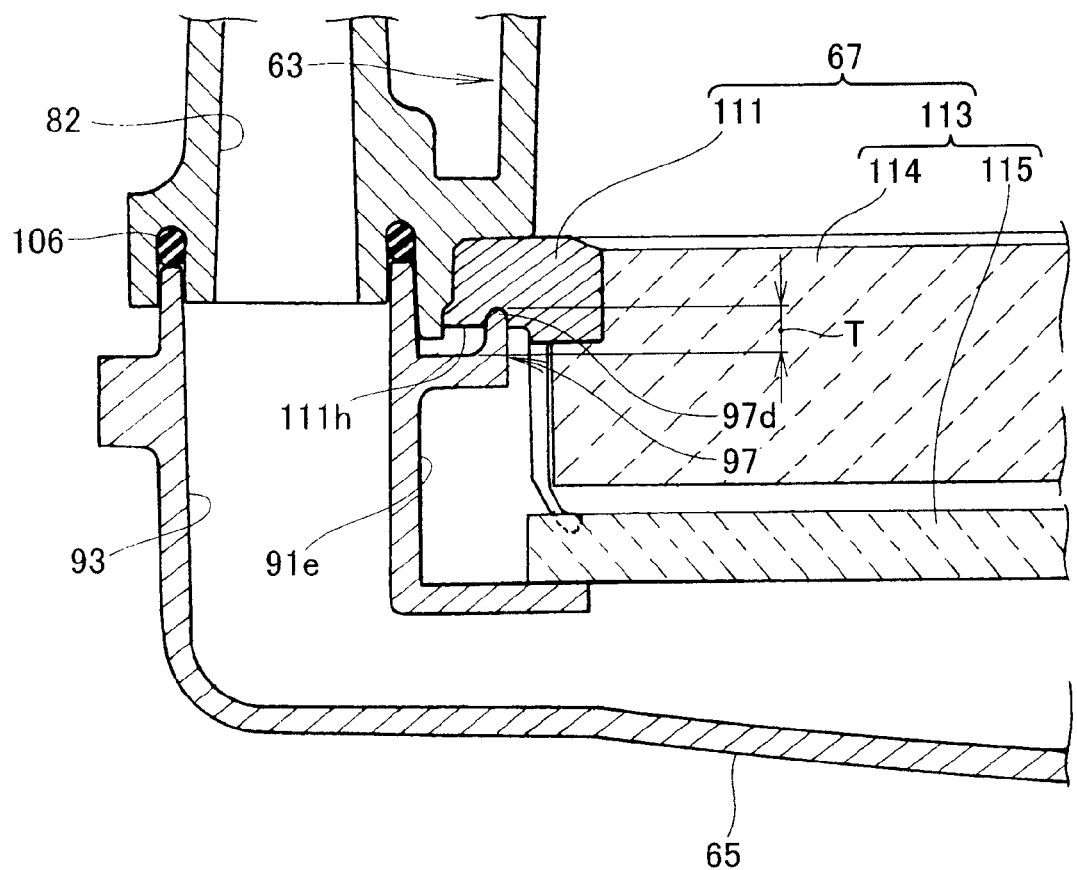
FIG. 12 is an enlarged cross-sectional view showing an area 12 of FIG. 6.

As shown in FIG. 12, in the state in which the cover 65 is attached to the cleaner case 63, a state is maintained in which a right compression surface 111*h* of the seal member 111 is compressed by (pressed against) the right projection 97*d* of the right side wall 91*e*.

As shown in FIG. 10, in the state in which the cover 65 is attached to the cleaner case 63, a state is maintained in which an upper compression surface 111*e* of the seal member 111 is compressed by the upper projection 97*a* of the upper wall 91*b*. Furthermore, in the state in which the cover 65 is attached to the cleaner case 63, a state is maintained in which a lower compression surface 111*f* of the seal member 111 is compressed by the lower projection 97*b* of the lower wall 91*c*.

As shown in FIG. 9, the cover inflow passage 93 is provided to the right side wall 91*e* of the cover peripheral wall 91, and communicates the cleaner inflow passage 82 with the cover space 99.

As shown in FIGS. 10 and 11, the pivot 94 protrudes outward toward the rear from the left side wall 91*d* of the cover peripheral wall 91. The pivot 94 has a substantially rectangular opening 103 capable of fitting on the support part 84; and a convex part 104 formed on the opening 103.

The opening 103 is formed substantially rectangular by upper and lower edges 103*a*, 103*b* and front and rear edges 103*c*, 103*d*, and the rear edge 103*d* is disposed behind the fitting ingress 85. The convex part 104 is formed at the rear edge 103*d*. The convex part 104 protrudes toward the fitting ingress 85 (i.e., toward the front), and is thereby formed so as to be capable of fitting in the fitting ingress 85 of the support part 84.

The convex part 104 is formed having a substantially semi-circular (curved) concave shape that corresponds to the fitting ingress 85. In the state in which the convex part 104 is fitted in the fitting ingress 85, the convex part 104 can smoothly pivot along the curved surface of the fitting ingress 85.

A hinge part (hinge) 80 is thus formed by the support part 84 and the pivot 94 by the fitting of the convex part 104 in the fitting ingress 85. The left side wall 91*d* of the cover 65 is thus connected to the left-side wall 88 of the cleaner case 63 by the hinge part 80. The hinge part 80 is fitted so that the convex part 104 can smoothly pivot along the curved surface of the fitting ingress 85. The cover 65 (left side wall 91*d*) is connected to the cleaner case 63 (left-side wall 88) by the hinge part 80, and the cover 65 is thereby supported by the cleaner case 63 so to be able to smoothly open and close via the hinge part 80.

As shown in FIGS. 3 and 5, the upper engaging part 95 of the cover 65 is provided above the cover inflow passage 93, and an upper attachment hole 95*a* through which the upper bolt 101 can be inserted is formed in the upper engaging part 95. The upper bolt 101 is inserted in the upper attachment hole 95*a*, and the upper bolt 101 protruding from the upper attachment hole 95*a* is screwed into an upper right corner part 81*b* of the cleaner peripheral wall 81. The upper engaging part 95 is thereby attached to the upper right corner part 81*b* of the cleaner peripheral wall 81 by the upper bolt 101.

The lower engaging part 96 is provided below the cover inflow passage 93, and a lower attachment hole 96*a* through which the lower bolt 101 can be inserted is formed in the lower engaging part 96. The lower bolt 101 is inserted in the lower attachment hole 96*a*, and the lower bolt 101 protruding from the lower attachment hole 96*a* is screwed into a lower right corner part 81*c* of the cleaner peripheral wall 81. The lower engaging part 96 is thereby attached to the lower right corner part 81*c* of the cleaner peripheral wall 81 by the lower bolt 101.

The left side wall 91*d* of the cover 65 is connected to the left-side wall 88 of the cleaner case 63 by the hinge part 80. Furthermore, the upper engaging part 95 is attached to the upper right corner part 81*b* by the upper bolt 101, and the lower engaging part 96 is attached to the lower right corner part 81*c* by the lower bolt 101. The cover 65 is thereby attached to the cleaner case 63 by the hinge part 80 and the upper and lower bolts 101.

The cleaner case 63 and the cover 65 are thus connected by the hinge part 80 so as to be able to open and close, and the number of engaging members for attaching the cover 65 to the cleaner case 63 can thereby be reduced to two, the engaging members being the upper and lower bolts 101.

The support part 84 of the hinge part 80 is also formed integrally with the cleaner case 63, and the pivot 94 of the hinge part 80 is formed integrally with the cover 65. The number of component parts can thereby be reduced, and a filter element 113 can be maintained and inspected without a time-consuming procedure.

By reducing the engaging members to two upper and lower bolts 101 for attaching the cover 65 to the cleaner case 63, the cover 65 can easily be attached and detached in a confined space.

Figure 13:
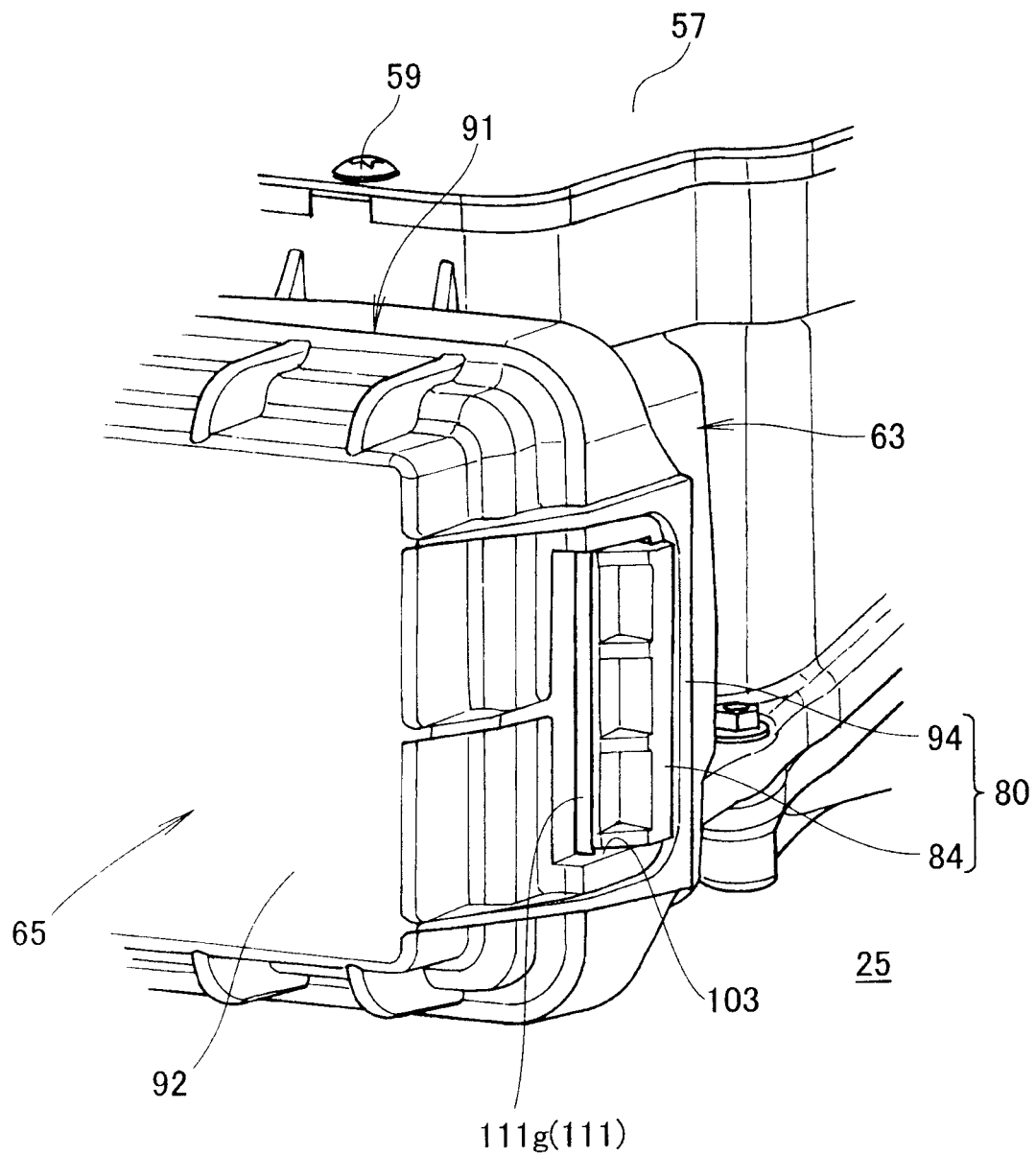
FIG. 13 is an enlarged perspective view showing an area 13 of FIG. 3.

As shown in FIGS. 5 and 13, the pivot 94 is provided to the left side wall 91*d* of the cover peripheral wall 91, and the opening 103 is provided in the pivot 94. The opening 103 is formed so that the left compression surface 111*g* of the seal member 111 can be exposed to the outside 25 when the cover 65 is attached to the cleaner case 63 (refer also to FIG. 11). The seal member 111 exposed in the opening 103 is thus visible from the outside 25 (i.e., the outside of the cover 65). The installation state of the seal member 111 (i.e., the filter element 113) can thereby be easily confirmed when the cover 65 is attached to the cleaner case 63, and installation of the seal member 111 can be facilitated.

As shown in FIGS. 6 and 9, the element unit 67 is provided between the cover 65 and the cleaner case 63. The element unit 67 is provided with the seal member 111 that is provided to the cleaner case 63, and the filter element 113 that is provided between the seal member 111 and the cover 65.

As shown in FIG. 10, the seal member 111 is formed of an elastically deformable rubber material or the like as a substantially rectangular frame, and is provided so as to be fitted into the receiving ingress 83 (FIG. 9) of the cleaner case 63. The seal member 111 has the upper seal part 111*a* and lower seal part 111*b* formed as a substantially rectangular frame, and the left seal part 111*c* and right seal part 111*d*.

The upper seal part 111*a* has the upper compression surface 111*e* capable of fitting against the upper projection 97*a*. The lower seal part 111*b* has the lower compression surface 111*f* capable of fitting against the lower projection 97*b*. The left seal part 111*c* has the left compression surface 111*g* capable of fitting against the left projection 97*c*. The right seal part 111*d* has the right compression surface 111*h* capable of fitting against the right projection 97*d*.

In the seal member 111 thus configured, the upper compression surface 111*e* is compressed by the upper projection 97*a* in the state in which the cover 65 is attached to the cleaner case 63. The lower compression surface 111*f* is compressed by the lower projection 97*b*. The left compression surface 111*g* is compressed by the left projection 97*c*. The right compression surface 111*h* is compressed by the right projection 97*d*.

Here, the upper and lower projections 97*a*, 97*b* and the left and right projections 97*c*, 97*d* form the substantially rectangular projection 97. The seal member 111 (upper and lower compression surfaces 111*e*, 111*f* and left and right compression surfaces 111*g*, 111*h*) is compressed by the projection 97 throughout the entire perimeter thereof. A seal is thus formed between the seal member 111 and the projection 97. The receiving ingress 83 of the cleaner case 63 and the projection 97 of the cover 65 are thereby sealed by the seal member 111.

The reasons for designing the upper middle part 97*e* of the upper projection 97*a* so as to protrude further than the left and right projections 97*c*, 97*d*, and for designing the lower middle part 97*f* of the lower projection 97*b* so as to protrude further than the left and right projections 97*c*, 97*d* will next be described in detail with reference to FIGS. 3, 9, and 10.

As shown in FIGS. 3 and 9, the cover 65 is attached to the cleaner case 63 by the hinge part 80 and the upper and lower engaging parts 95, 96 (upper and lower bolts 101). The cover 65 is formed so as to be substantially rectangular as viewed from above when in a landscape orientation. The gap between the hinge part 80 and the upper and lower engaging parts 95, 96 (upper and lower bolts 101) is thus relatively large.

A configuration in which the entire length of the upper compression surface 111*e* is suitably compressed by the upper projection 97*a* shown in FIG. 10, and the entire length of the lower compression surface 111*f* is suitably compressed by the lower projection 97*b* may therefore be difficult to obtain.

A configuration is therefore adopted in which the upper middle part 97*e* of the upper projection 97*a* protrudes further than the left and right projections 97*c*, 97*d*, and the lower middle part 97*f* of the lower projection 97*b* protrudes further than the left and right projections 97*c*, 97*d*. The entire length of the upper compression surface 111*e* can thereby be suitably (reliably) compressed by the upper projection 97*a*, and the entire length of the lower compression surface 111*f* can be suitably (reliably) compressed by the lower projection 97b. The state of compression of the seal member 111 by the projection 97 (i.e., the cover 65) can thereby be suitably maintained throughout the entire perimeter of the seal member 111.

The protrusion dimension T (refer to FIGS. 11 and 12) of the left and right projections 97c, 97d is restricted to a small value. The left projection 97c can thus be suitably separated from the left compression surface 111g of the seal member 111 when the cover 65 is opened about the support part 84 (i.e., the fitting ingress 85) of the hinge part 80.

In the same manner, the right projection 97d can be suitably separated from the right compression surface 111h of the seal member 111. The state in which the seal member 111 is fitted in the receiving ingress 83 (FIG. 9) of the cleaner case 63 can thereby be maintained.

Moreover, the left compression surface 111g of the seal member 111 can be suitably compressed by the left projection 97c when the cover 65 is closed about the support part 84 (fitting ingress 85) of the hinge part 80.

In the same manner, the right compression surface 111h of the seal member 111 can be suitably compressed by the right projection 97d. The state in which the seal member 111 is fitted in the receiving ingress 83 (FIG. 9) of the cleaner case 63 can thereby be maintained when the cover 65 is closed. The filter element 113 can thereby be easily retained in a predetermined position.

As shown in FIGS. 6 and 9, the filter element 113 is sandwiched between the seal member 111 and the cover 65. The filter element 113 is provided with a first filter element 114, the entire perimeter of which is supported by the seal member 111, and a second filter element 115 which is sandwiched between the first filter element 114 and the cover 65.

Specifically, the first filter element 114 and the second filter element 115 are provided partway (i.e., between the upstream point 43a and the downstream point 43b (FIG. 3) in the intake passage 43. The intake passage 43 is the passage shown in FIG. 2 for communicating the air intake part 42 with the intake port 44 of the engine 16.

By the air cleaner device 45, air is conducted from the upstream point 43a of the intake passage 43 to the cover space 99 through the labyrinth passage 75, the cleaner inflow passage 82, and the cover inflow passage 93. The air conducted to the cover space 99 is cleaned by the first filter element 114 and the second filter element 115, and the cleaned air is mixed with gas fuel by the mixer. The gas fuel mixed by the mixer is conducted to the throttle valve. The gas fuel passing through the throttle valve is conducted to the downstream point 43b of the intake passage 43.

An example of intake noise suppression by the air cleaner device 45 will next be described based on FIGS. 14A, 14B, and 15.

Figure 14A:
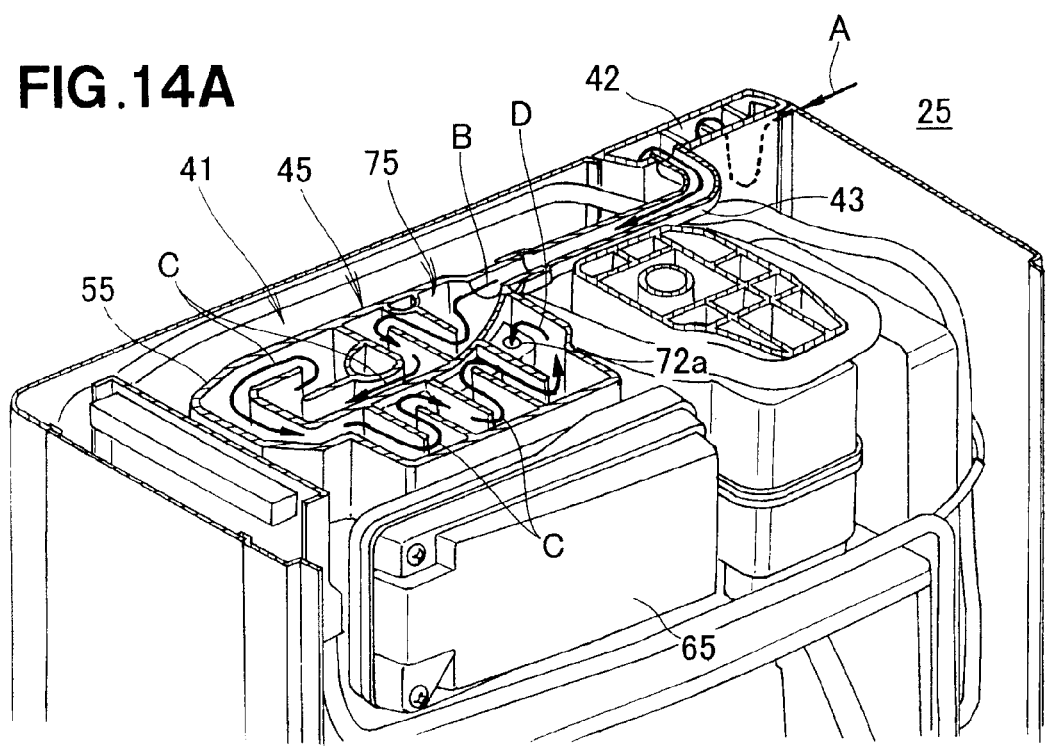
FIGS. 14A and 14B illustrate an example of intake noise suppression by the air cleaner device.

As shown in FIG. 14A, outside air is drawn into the intake passage 43 as indicated by the arrow A from the air intake part 42 of the intake system 41. The air drawn into the intake passage 43 is conducted as indicated by the arrow B to the labyrinth passage 75. The air conducted to the labyrinth passage 75 is conducted as indicated by the arrows C along the labyrinth passage 75. The air passing through the labyrinth passage 75 is conducted as indicated by the arrow D toward the outflow port 72a. The air passing through the outflow port 72a is conducted to the cleaner inflow passage 82 (FIG. 14B).

By forming the labyrinth passage 75 in the air cleaner device 45, the passage for air is formed in a maze shape (curved shape), and an adequate passage length for air can be ensured. Intake noise of the engine 16 that accompanies intake pulsation can thereby be reduced.

Formation of the labyrinth passage 75 by the intake case 55 and the sound absorbing member 61 (FIG. 4) enables the sound absorbing member 61 to be provided in a portion of the labyrinth passage 75. Intake noise of the engine 16 that accompanies intake pulsation can thereby be more satisfactorily reduced by the sound absorbing member 61.

Figure 14B:
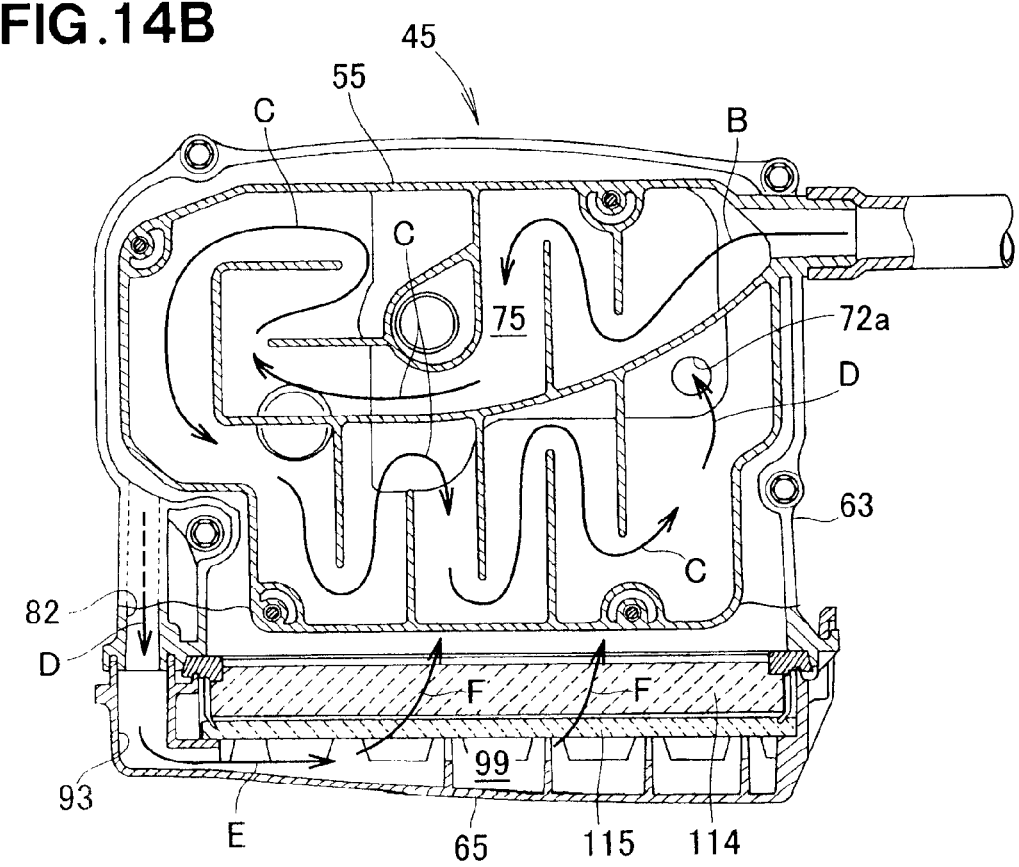

As shown in FIG. 14B, the air conducted as indicated by the arrow D to the cleaner inflow passage 82 is conducted as indicated by the arrow E through the cover inflow passage 93 to the cover space 99. The air conducted to the cover space 99 is conducted as indicated by the arrows F toward the second filter element 115 and the first filter element 114.

The air is cleaned by the second filter element 115 and the first filter element 114, and the cleaned air is mixed with gas fuel by the mixer. The gas fuel mixed by the mixer is conducted to the throttle valve. The gas fuel passing through the throttle valve is conducted to the downstream point 43b (FIG. 15) of the intake passage 43.

Figure 15:
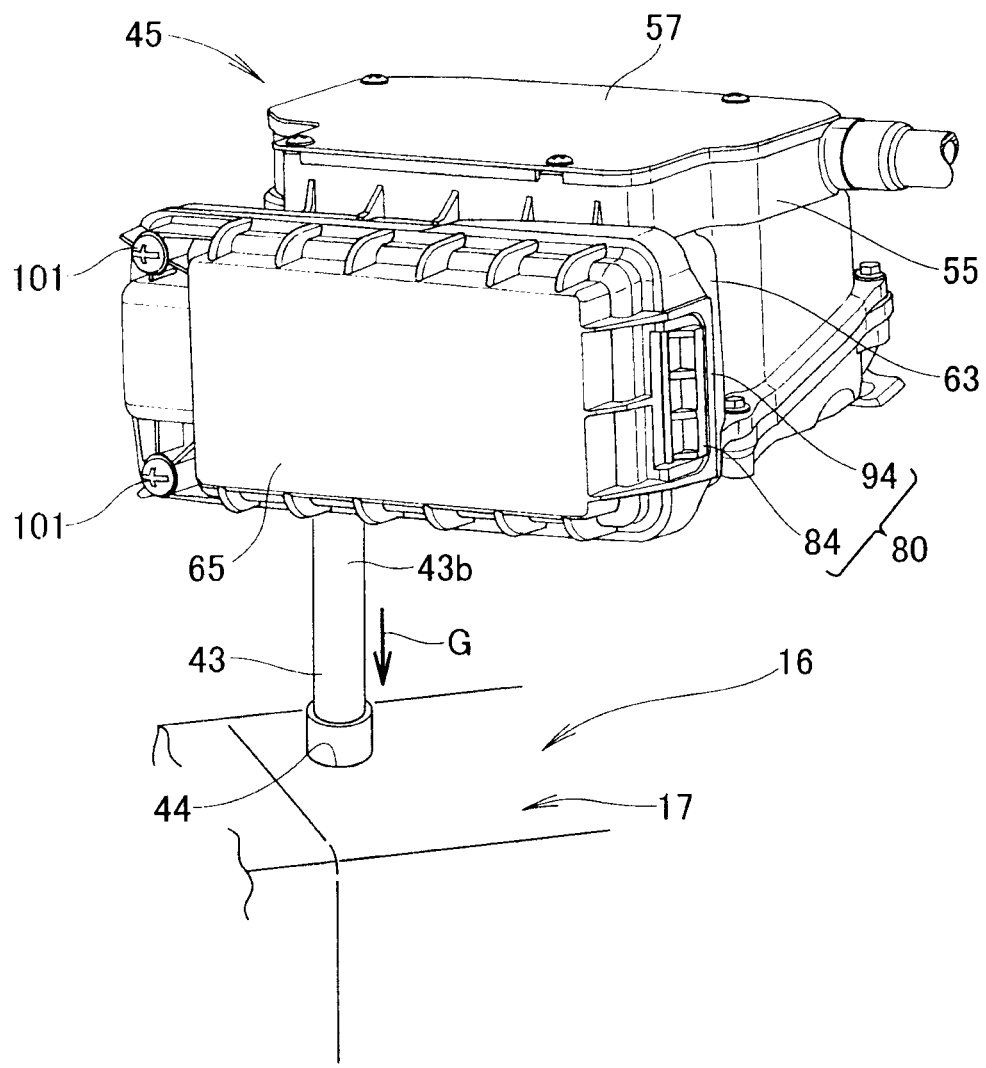
FIG. 15 is a perspective view showing an example of the mixing of air cleaned by the air cleaner device with gas and conduction of the air to the engine.

As shown in FIG. 15, the gas fuel conducted to the downstream point 43b of the intake passage 43 is conducted as indicated by the arrow G through the intake passage 43 to the intake port 44 of the engine body 17. The gas fuel passing through the intake port 44 is introduced into the combustion chamber, and the engine 16 is thereby driven.

An example of removing the cover 65 from the cleaner case 63 will next be described based on FIGS. 16A through 18B.

Figure 16A:
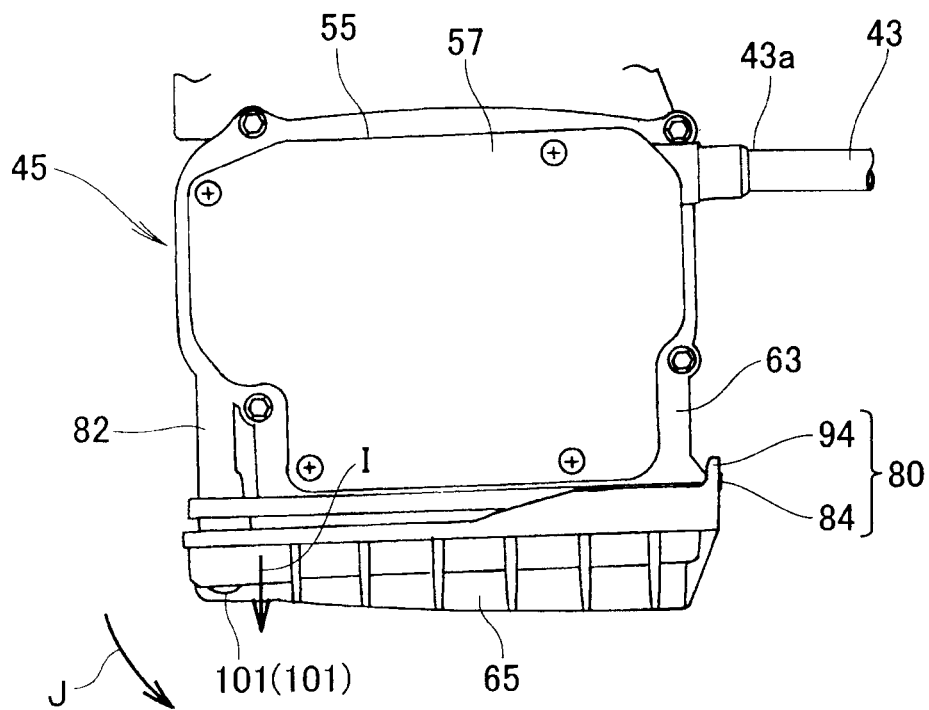
FIGS. 16A and 16B illustrate an example of opening of the cover.

As shown in FIG. 16A, the upper and lower bolts 101 are unfastened as indicated by the arrow I. After the upper and lower bolts 101 are unfastened, the cover 65 is opened about the support part 84 (i.e., the fitting ingress 85 (FIG. 16B)) of the hinge part 80, as indicated by the arrow J.

Figure 16B:
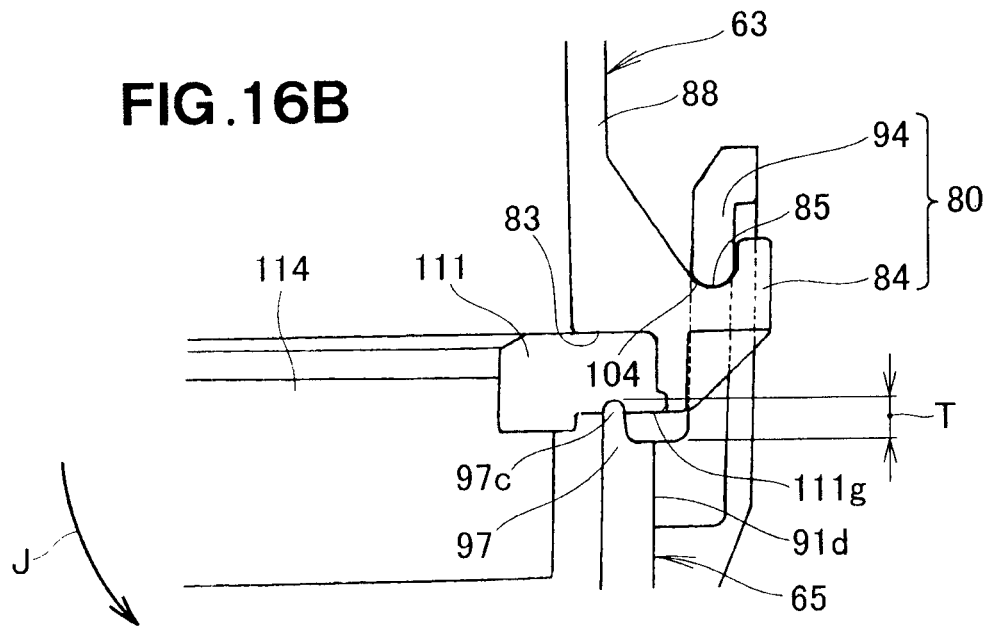

As shown in FIG. 16B, the fitting ingress 85 is formed having a substantially semi-circular (curved) concave shape. The convex part 104 of the pivot 94 is formed having a substantially semi-circular (curved) convex shape that corresponds to the fitting ingress 85. In the state in which the convex part 104 is fitted in the fitting ingress 85, the convex part 104 can smoothly pivot along the curved surface of the fitting ingress 85.

The left side wall 91d of the cover 65 is connected to the left-side wall 88 of the cleaner case 63 by the hinge part 80, and the cover 65 can thereby be smoothly opened as indicated by the arrow J about the fitting ingress 85. As the cover 65 is opened, the left projection 97c of the left side wall 91d moves in the direction of the arrow J.

Figure 17A:
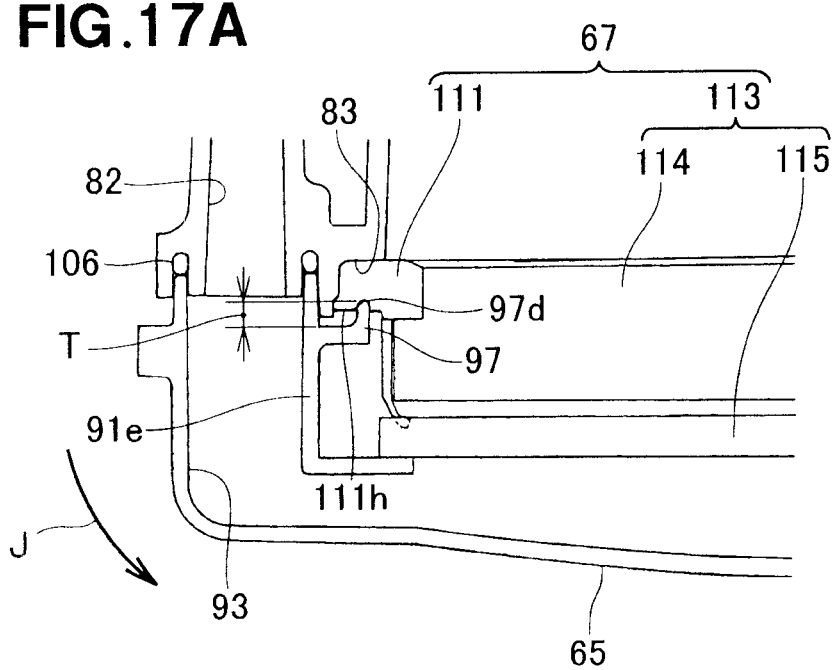
FIG. 17A and FIG. 17B illustrate the cover opened to a predetermined position.

As shown in FIG. 17A, as the cover 65 is opened as indicated by the arrow J, the right projection 97d of the right side wall 91e moves in the direction of the arrow J.

Figure 17B:
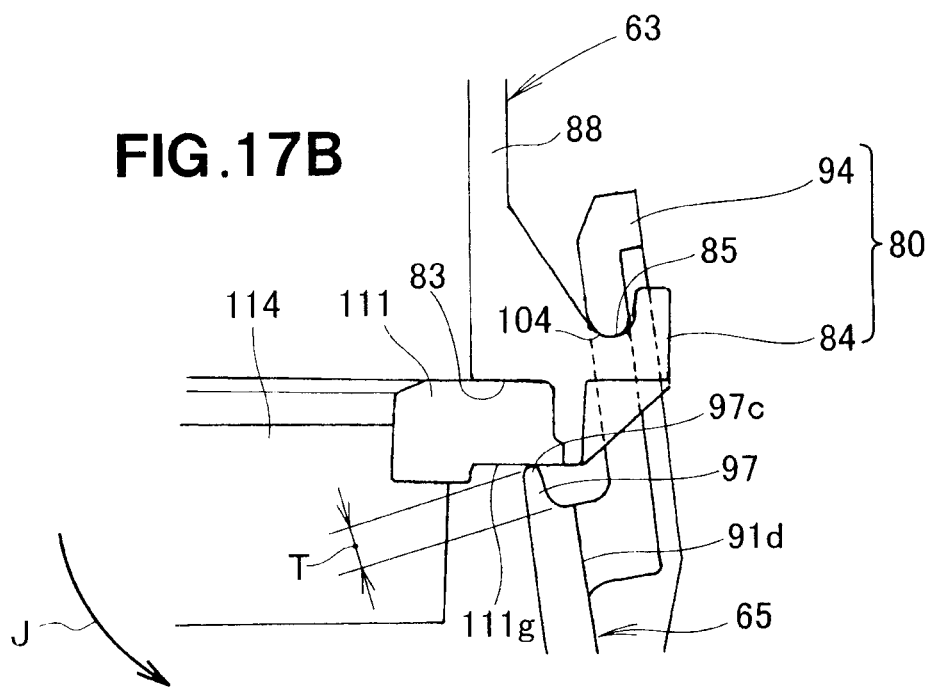

As shown in FIGS. 16B and 17A, the protrusion dimension T of the left and right projections 97c, 97d is restricted to a small value. The left projection 97c can thus be suitably separated from the left compression surface 111g when the cover 65 is opened, as shown in FIG. 17B. In the same manner, the right projection 97d can be suitably separated from the right compression surface 111h, as shown in FIG. 17A. The state in which the seal member 111 is fitted in the receiving ingress 83 of the cleaner case 63 (FIG. 16A) can thereby be maintained.

As shown in FIG. 18A, in a state in which the cover 65 is opened to a predetermined position P, the cover 65 is moved as indicated by the arrow K and the convex part 104 is removed from the fitting ingress 85. As the convex part 104 is removed from the fitting ingress 85, the pivot 94 is removed from the support part 84.

As shown in FIG. 18B, removing the convex part 104 (FIG. 18A) from the fitting ingress 85 enables the cover 65 to be easily removed from the cleaner case 63 as indicated by the arrow L. The first and second filter elements 114, 115 and other components can be maintained and inspected (maintenance) by removing the cover 65 from the cleaner case 63.

As shown in FIGS. 17A and 17B, since the protrusion dimension T of the left and right projections 97c, 97d is restricted to a small value, the left compression surface 111g can be suitably compressed by the left projection 97c when the cover 65 is closed about the fitting ingress 85 of the hinge part 80. In the same manner, the right compression surface 111h can be suitably compressed by the right projection 97d. The state in which the seal member 111 is fitted in the receiving ingress 83 of the cleaner case 63 can thereby be maintained when the cover 65 is closed. The filter element 113 can thereby be easily retained in a predetermined position.

The air cleaner device of the present invention is not limited to the embodiment described above, and may be modified or improved as appropriate. For example, a gas engine 16 is described as the motor in the embodiment above, but the present invention is not limited to this configuration, and a gasoline engine or other engine may also be used.

An example is described in the above embodiment in which the air cleaner device 45 is used in a cogeneration apparatus 10, but the present invention is not limited to this configuration, and the air cleaner device 45 may also be used in a cultivator, snow remover, or other apparatus.

In the above embodiment, the bolts 101 are described as the engaging members for attaching the cover 65 to the cleaner case 63, but the present invention is not limited to this configuration, and clamps or other engaging members may also be used.

In the above embodiment, an example is described in which the first filter element 114 and the second filter element 115 are provided as filter elements 113, but the present invention is not limited to this configuration, and any number may be selected as the number of filter elements 113.

The shapes and configurations described in the embodiment for the cogeneration apparatus 10, engine 16, intake passage 43, intake port 44, air cleaner device 45, cleaner case 63, cover 65, hinge part 80, support part 84, fitting ingress 85, cover peripheral wall 91, pivot 94, upper and lower engaging parts 95, 96, projection 97, upper and lower middle parts 97e, 97f, opening 103, convex part 104, seal member 111, filter element 113, and other components are also not limited to the examples described and may be modified as appropriate.

The present invention is suitable for application to a cogeneration apparatus that is provided with an air cleaner device capable of drawing outside air into an intake passage communicated with a motor, and cleaning the indrawn air.

What is claimed is:

1. An air cleaner device comprising:
a cleaner case provided to an intake passage communicating with an intake port of a motor;
a cover detachably attached to the cleaner case; and
a filter element provided between the cover and the cleaner case, so that air drawn into the intake passage from an outside is cleaned by the air filter and introduced into the intake port,
wherein the air cleaner device further comprises:
a support part formed as an integral part of the cleaner case and having a fitting ingress at a region of the support part on an opposite side from the cover; and
a pivot formed as an integral part of the cover and having a convex part capable of fitting in the fitting ingress of the support part; and
a hinge part formed by engagement of the convex part in the fitting ingress so as to openably closably connecting, with the support part and the pivot, the cover to the cleaner case, wherein the cover has an opening provided in the pivot of the cover, and, with the cover being attached to the cleaner case, a seal member for supporting the filter element is capable of exposing to the outside through the opening.

2. The air cleaner device of claim 1, wherein the cleaner case comprises an elastically deformable seal member for supporting an entire perimeter of the filter element, the cover has a projection provided in such a manner as to be capable of compressing the entire perimeter of the seal member, and engaging parts provided on an opposite side of the cover from the hinge part, the engaging parts being capable of engaging with the cleaner case, and the projection is formed to have a large protrusion dimension in middle parts thereof between the hinge part and the engaging parts within a peripheral wall of the cover.

3. An air cleaner device comprising: a cleaner case provided to an intake passage communicating with an intake port of a motor; a cover detachably attached the cleaner case; and a filter element provided between the cover and the cleaner case, so that air drawn into the intake passage from an outside is cleaned by the air filter and introduced into the intake port,
wherein the air cleaner device further comprises:
a support part provided to the cleaner case and having a fitting ingress at a region on an opposite side thereof from the cover; and
a pivot provided to the cover and having a convex part capable of fitting in the fitting ingress of the support part; and
a hinge part formed by engagement of the convex part in the fitting ingress so as to openably closably connecting, with the support part and the pivot, the cover to the cleaner case, wherein the cover has an opening provided in the pivot of the cover, and, with the cover being attached to the cleaner case, a seal member for supporting the filter element is capable of exposing to the outside through the opening.

4. The air cleaner device of claim 3, wherein the seal member is elastically deformable for supporting an entire perimeter of the filter element, the cover has a projection provided in such a manner as to be capable of compressing the entire perimeter of the seal member, and engaging parts provided on an opposite side of the cover from the hinge part, the engaging parts being capable of engaging with the cleaner case, and the projection is formed to have a large protrusion dimension in middle parts thereof between the hinge part and the engaging parts within a peripheral wall of the cover.

* * * * *